(12) United States Patent
Tanaka et al.

(10) Patent No.: US 8,072,870 B2
(45) Date of Patent: Dec. 6, 2011

(54) OPTICAL PICKUP AND OPTICAL DISC DRIVE

(75) Inventors: Toshiyasu Tanaka, Osaka (JP); Fumitomo Yamasaki, Nara (JP); Kanji Wakabayashi, Kyoto (JP); Yoshiaki Komma, Osaka (JP)

(73) Assignee: Panasonic Corporation, Osaka (JP)

( * ) Notice: Subject to any disclaimer, the term of this patent is extended or adjusted under 35 U.S.C. 154(b) by 793 days.

(21) Appl. No.: 11/966,079

(22) Filed: Dec. 28, 2007

(65) Prior Publication Data

US 2008/0186836 A1 Aug. 7, 2008

Related U.S. Application Data

(60) Provisional application No. 60/877,615, filed on Dec. 29, 2006.

(30) Foreign Application Priority Data

Mar. 2, 2007 (JP) .................................. 2007-052489

(51) Int. Cl.
G11B 7/135 (2006.01)
(52) U.S. Cl. ................................................. 369/112.24
(58) Field of Classification Search ........................ None
See application file for complete search history.

(56) References Cited

U.S. PATENT DOCUMENTS

| 6,438,090 B1* | 8/2002 | Nakano ..................... 369/112.24 |
| 2005/0163015 A1* | 7/2005 | Sato et al. ................... 369/112.1 |
| 2005/0254391 A1* | 11/2005 | Nagatomi et al. ........ 369/109.02 |
| 2006/0002247 A1* | 1/2006 | Kim et al. .................. 369/44.11 |
| 2007/0008858 A1* | 1/2007 | Yukawa .................... 369/112.16 |

FOREIGN PATENT DOCUMENTS

| JP | 7-98431 | 4/1995 |
| JP | 10-10308 | 1/1998 |
| JP | 11-120606 | 4/1999 |
| JP | 2001-344803 | 12/2001 |
| JP | 2006-147075 | 6/2006 |

OTHER PUBLICATIONS

Kousei Sano et al., "Optical Pickup for Recording to Dual-Layer High-Speed Blu-Ray Disc", Technical Digest of Optical Data Storage (ODS) Topical Meeting and Tabletop Exhibit, Optical Society of America (OSA), Portland, Oregon, 2007, pp. 1-3.

Toshiyasu Tanaka et al., "Optical Pickup for Recording to Dual-Layer 2X-Speed Blu-Ray Disc, DVD and Compact Disc", Optical Data Storage, 2006, edited by Ryuichi Katayama, Tuviah E. Schlesigner Proc. of SPIE, vol. 6282 62822C-1-10.

(Continued)

Primary Examiner — Christopher R Lamb
(74) Attorney, Agent, or Firm — Wenderoth, Lind & Ponack, L.L.P.

(57) ABSTRACT

The present invention provides an optical structure of an optical pickup for adjusting an exit light quantity of a light source, so as not to have adverse effect on reliability of semiconductor laser to be suited to the quantity of light. The exit light quantity of the light source is adjusted in consideration of a difference in reflectivity of optical discs used in recording or reproducing. With this configuration, when composing a compatible optical pickup for recording or reproducing BD and HD DVD by using light diffraction means of diffraction type, the reliability of semiconductor laser used as light source is enhanced with respect to diffraction efficiency.

10 Claims, 19 Drawing Sheets

OTHER PUBLICATIONS

Kousei Sano et al., "Novel One-Beam Tracking Detection Method for Dual-Layer Blu-Ray Discs", Japanese Journal of Applied Physics, vol. 45, No. 2B, 2006, pp. 1174-1177.

"A Bit Engine for Digital Video Recording (DVR) on a 12 CM Disc With 22 Gbytes User Capacity and 50 MBIT/S Data Rate", Optical Data Storage, 2000, Douglas G. Stinson, Ryuichi Katayama Editors, Proceedings of SPIE, vol. 4090 (2000), pp. 270-274.

Fumitomo Yamasaki et al., "Radial Tilt Detection Using Push-Pull Signals", Japanese Journal of Applied Physics, vol. 45, No. 2B, 2006, pp. 1158-1161.

* cited by examiner

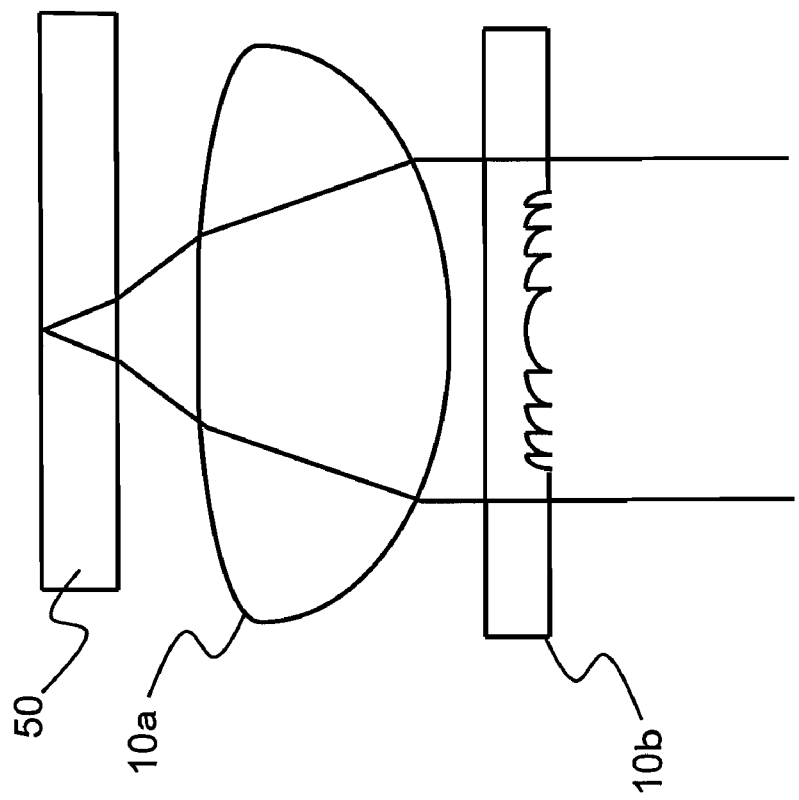
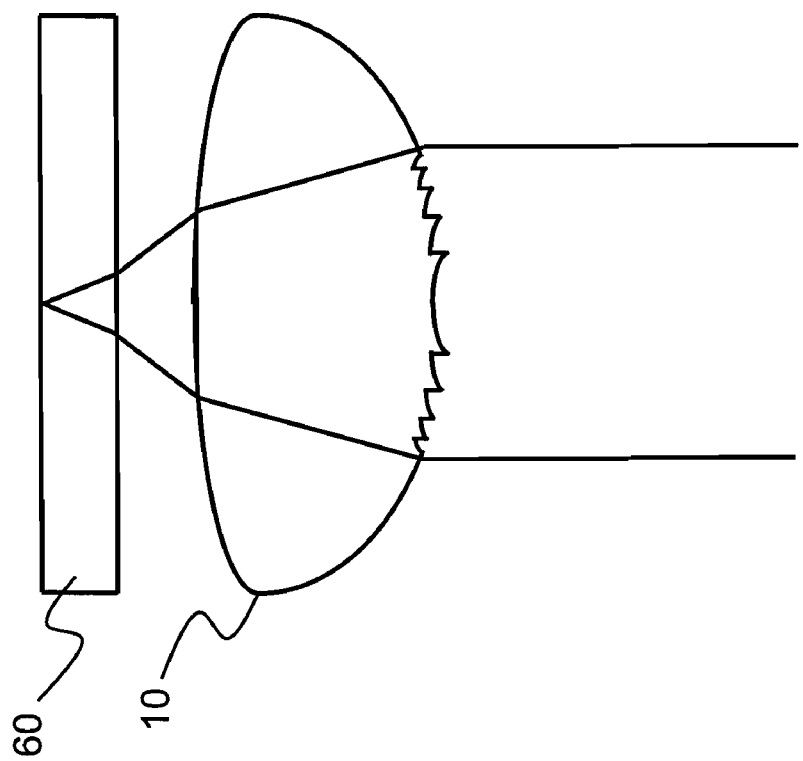

OPTICAL PICKUP AND OPTICAL DISC DRIVE

This application claims the benefit of U.S. Provisional Application No. 60/877,615, filed Dec. 29, 2006.

BACKGROUND OF THE INVENTION

1. Field of the Invention

The present invention relates to an optical pickup for recording or reproducing information optically in recording media such as plural kinds of optical discs, and an optical disc device having such optical pickup.

2. Description of the Related Art

Recently, as blue-violet semiconductor lasers are put in practical use, a Blu-ray disc (BD) is practiced as an optical recording medium (also known as optical disc) of high density and large capacity realized in a same size as compact disc (CD) or digital versatile disc (DVD). The BD is an optical disc of about 0.1 mm in thickness of protective substrate capable of recording or reproducing with a blue-violet laser beam source of about 400 nm in wavelength, and an objective lens enhanced in numerical aperture (NA) to 0.85.

On the other hand, there is also realized an HD DVD of 0.6 mm in thickness of protective substrate, using a blue-violet laser beam source of about 400 nm in wavelength, and an objective lens of numerical aperture of 0.65.

A compatible optical pickup is proposed for recording or reproducing information by focusing laser beam with one objective lens on the information recording surface of optical discs that is different in the thickness of protective substrate.

An optical pickup having a focusing optical system capable of focusing laser beam up to diffraction limit on optical discs differing in thickness of protective substrate is disclosed in Japanese Unexamined Patent Publication No. 7-98431 and 10-10308.

A configuration of a conventional optical pickup disclosed in Japanese Unexamined Patent Publication No. 7-98431 is shown in FIG. 18. In FIG. 18, an optical pickup 130 includes a first light source for emitting a red laser beam 101, a beam splitter 103, a collimator lens 104, a diffractive lens 105, an objective lens 106, a detection lens 108, and a light detector 109. Reference numeral 70 is a DVD, which is an optical disc of 0.6 mm in thickness of protective substrate.

Operation of optical pickup 130 for recording or reproducing information in a first low-density disc (DVD) 70 is explained. The red laser beam emitted from the first light source 101 passes through the beam splitter 103, and is converted into substantially parallel light by the collimator lens 104, and further passes through the diffractive lens 105, and is focused by the objective lens 106 into a light spot on the information recording surface of the first low-density disc 70 over the protective substrate. The red laser beam of the backward path reflected by the information recording surface of the first low-density disc 70 passes through the objective lens 106, diffractive lens 105, and collimator lens 104 via the same optical path as the forward path, and is reflected by the beam splitter 103, and is provided with a specified astigmatism by the detection lens 108, and is guided into the light detector 109, and the light detector 109 generates information signal and servo signal.

Referring now to FIG. 19, operation of optical pickup 130 is explained about recording or reproducing on a second low-density disc 80 or an optical disc of 1.2 mm in protective substrate thickness. The red laser beam emitted from the first light source 101 passes through the beam splitter 103, and is converted into substantially parallel light in the collimator lens 104, and is further diffracted in the diffractive lens 105, and is focused by the objective lens 106 into a light spot on the information recording surface of the second low-density disc 80 over the protective substrate. The red laser beam of the backward path reflected by the information recording surface of the second low-density disc 80 passes through the objective lens 106, hologram 105, and collimator lens 104 via the same optical path as the forward path, and is reflected by the beam splitter 103, and is provided with a specified astigmatism by the detection lens 108, and is guided into the light detector 109, and the light detector 109 generates information signal and servo signal.

As for the focus error signal for recording or reproducing the first low-density disc 70 or second low-density disc 80, a method of astigmatism may be applied, that is, the focusing spot provided with astigmatism by the detection lens 108 is detected by four-division pattern in the light detector 109. As for the tracking error signal a so-called three-beam method or differential push-pull (DPP) method with main beam and sub-beam produced by diffraction grating (not shown) may be applied.

Function of diffractive lens 105 and objective lens 106 is described specifically by referring to FIG. 20, FIG. 21A, and FIG. 21B.

The diffractive lens 105 is provided with a diffraction pattern 105a as shown in FIG. 20 in order to focus tiny light spots in the first low-density disc 70 and second low-density disc 80. The diffractive lens 105 has a diffraction efficiency of +primary diffraction light of less than 100%, and is designed to have a sufficient intensity of transmission light (also known as 0-order diffraction light, and transmission light is one of diffraction light). By blazing the diffraction light 105, the sum of quantities of light of 0-order diffraction light and +primary diffraction light can be increased, and the use efficiency of light is enhanced.

The objective lens 106 has the numerical aperture NA of 0.6, and is designed to form a focusing light spot of diffraction limit on the first low-density disc 70 of 0.6 mm in protective substrate thickness when receiving laser beam directly without diffraction by the diffractive lens 105 (that is, 0-order diffraction light) as shown in FIG. 21A.

On the other hand, as shown in FIG. 21B, +primary diffraction light diffracted by the diffractive lens 105 is focused on the second low-density disc 80 by the objective lens 106. Herein, the +primary diffraction light is corrected in aberration so as to form a light spot of diffraction limit on the second low-density disc 80 of 1.2 mm in protective substrate thickness.

Thus, by combining the diffractive lens 105 and objective lens 106 for diffracting part of incident light, a two-focus lens capable of forming focusing spots focused to diffraction limit on optical discs mutually different in substrate thickness is realized.

Since the diffractive lens 105 has a lens action, positions of two foci in an optical axis direction are different. Therefore, while recording or reproducing information with the light spot formed in one focus, the light spot formed in other focus is spread widely, and no effect is given to recording or reproducing of information.

As described above, the use of the optical pickup 130 can record or reproduce the information with one objective lens on different kids of optical disks.

Japanese Unexamined Patent Publication No. 2006-147075 discloses an optical pickup applicable to four kinds of optical discs, that is, CD, DVD, BD, HD DVD, by changing over the combination of two objective lenses and light sources. Japanese Unexamined Patent Publication No. 2001-

344803 discloses a configuration for corresponding to plural kinds of optical discs by optically changing over the optical path of the laser beam emitted from one light source.

BRIEF SUMMARY OF THE INVENTION

Japanese Unexamined Patent Publication No. 7-98431 and 10-10308 disclose configurations of compatible optical pickup applicable to plural kinds of optical discs different in protective substrate thickness, such as DVD and CD, with a two-focus lens using hologram.

However, in the above-mentioned prior art, the quantity of light emitted from the light source is not defined accurately. For example, in recording in optical disc, it is generally known that the quantity of light is required by more than tens of times on the recording surface as compared with the reproducing mode, but since the diffraction efficiency is less than 100% in the prior art, the loss portion of diffraction efficiency must be compensated by increase of quantity of light in the light source in order to maintain the quality of recording and reproducing the optical disc at a same level as in 100% diffraction efficiency mode, and an extra burden is thus applied to the semiconductor laser.

In the conventional configuration, for example in Japanese Unexamined Patent Publication No. 2006-147075, an actuator of optical pickup is an actuator of so-called axis rotation type, and the actuator cannot be inclined relatively to the optical system, and the optical disc may be warped by fluctuations of optical discs or sudden temperature changes, and the generated coma aberration may not be corrected. Japanese Unexamined Patent Publication No. 2001-344803 discloses an effective configuration as an optical pickup applicable to conventional DVD or CD, but in recording or reproducing in optical disc of new BD standard, consideration must be given to compensation of spherical aberration caused by difference in transparent substrate material.

Specifically it is known to cancel spherical aberration by, for example, moving the collimator lens in an optical axis direction of laser beam, using the laser beam entering the objective lens as diverging ray or converging ray, and generating spherical aberration of reverse polarity by objective lens. Like the optical pickup disclosed in Japanese Unexamined Patent Publication No. 2001-344803, in the case where the collimator lens is movable in the optical axis direction is provided only in the forward path, when the spherical aberration is corrected by moving the collimator lens in the optical axis direction of laser beam, diverging ray or converging ray enters the optical system of the forward path, and defocus and spherical aberration occur on the light detector. As a result, the focus error signal involves an offset, and the recording or reproducing performance of optical disc decreases, but measures for solving this problem are not proposed.

The present invention provides an optical pickup not requiring no changeover of objective lenses by changing over the optical path of the laser beam optically, which includes spherical aberration correcting means of high-density optical disc such as BD or HD DVD, thereby realizing a compatible optical pickup for recording or reproducing information by converging three laser beams different in wavelength with two objective lenses in mutually different optical discs such as CD, DVD, BD, HD DVD, and in such compatible pickup, it is an object of the present invention to enhance the reliability by reducing the load to the semiconductor laser as an important element of optical pickup.

In order to solve the above technical problems, the invention provides the optical pickup having a following configuration.

According to a first aspect of the present invention, there is provided an optical pickup for reproducing a first high-density recording medium having a first substrate thickness, a second high-density recording medium having a second substrate thickness, and a low-density recording medium, comprising:

a light source, an optical path changeover unit for changing over a laser beam emitted from the light source between a first optical path for the first high-density recording medium and a second optical path for the second high-density recording medium and low-density recording medium, a first focusing lens system for focusing the laser beam of the first optical path on the information recording surface of the first high-density recording medium, a second focusing lens system having a diffraction grating for focusing the laser beam of the second optical path on the information recording surface of the second high-density recording medium or low-density recording medium, and a light quantity adjusting unit for controlling the light source so that the quantity of light emitted from the light source when reproducing the first high-density recording medium may be smaller than the quantity of light emitted from the light source when reproducing the second high-density recording medium.

According to a second aspect of the present invention, there is provided an optical pickup including:

a first light source for a first high-density recording medium having a first substrate thickness and a second high-density recording medium having a second substrate thickness, a second light source for a low-density recording medium of lower density than the first and the second high-density recording media, a dichroic mirror different in transmission and reflection characteristic between a first laser beam and a second laser beam, for emitting the first laser beam and the second laser beam incident from different optical paths via a same optical path, a polarization converting element for converting polarization of first laser beam emitted through the dichroic mirror, a beam splitter for polarizing and separating the first laser beam out of the first and second laser beams emitted through the dichroic mirror according to the polarization generated by the polarization converting element, a first focusing lens system for focusing the first laser beam having the first optical path reflected by the beam splitter on the information recording surface of first high-density recording medium, a second focusing lens system having a diffraction grating for focusing the laser beam having the second optical path configured by the first laser beam and the second laser beam passing through the beam splitter on the information recording surface of a second high-density recording medium or the low-density recording medium, and a light quantity adjusting unit for controlling the first light source so that the quantity of light emitted from the first light source may be smaller when focused by the first focusing lens system than when focused by the second focusing lens system.

According to a third aspect of the present invention, there is provided an optical pickup including:

a first light source for a first high-density recording medium having a first substrate thickness and a second high-density recording medium having a second substrate thickness, a second light source for a low-density recording medium being lower density than the first and second high-density recording media, a polarization converting element for converting polarization of a first laser beam emitted from the first light source, a prism having a first reflection plane for receiving the first laser beam passing through the polarization converting element and separating the first laser beam depending on the polarization generated by the polarization converting element, and a second reflection plane for receiving the second laser beam and the first laser beam reflected by the first reflection plane, and reflecting the first laser beam, and transmitting the second laser beam, so that the first laser beam reflected by the first reflection plane and the second laser beam passing through the first reflection plane pass via a same optical path, a first focusing lens system for focusing the first laser beam having the first optical path passing through the first reflection plane on the information recording surface of a first high-density recording medium, a second focusing lens system having a diffraction grating for focusing the first laser beam reflected by the second reflection plane and the second laser beam having a second optical path passing through the second reflection plane on the information recording surface of a second high-density recording medium or the low-density recording medium, and a light quantity adjusting unit for controlling the first light source so that the quantity of light emitted from the first light source may be smaller when focused by the first focusing lens system than when focused by the second focusing lens system.

According to a fourth aspect of the present invention, there is provided an optical pickup including:

a first light source for emitting a first laser beam having wavelength λ1, an optical path changeover unit for changing over the first laser beam emitted from the first light source between a first optical path and a second optical path, a first coupling lens disposed in the first optical path, for converting the first laser beam into a substantially parallel light, a first objective lens disposed in the first optical path, for converging the first laser beam passing through the first coupling lens on a first high-density recording medium, a second coupling lens disposed in the second optical path, for converting the first laser beam into a substantially parallel light, and a second objective lens disposed in the second optical path, for converging the first laser beam passing through the second coupling lens on a second high-density recording medium different from the first high-density recording medium, wherein the optical path changeover unit changes over the optical path of the first laser beam by changing over transmission and reflection of the first laser beam emitted from the first light source, the first coupling lens converts the first reflection laser beam of the first laser beam reflected by the first high-density recording medium into a converging light, the second coupling lens converts the second reflection laser beam of the first laser beam reflected by the second high-density recording medium into the converging light, and the first light source is controlled by a light quantity adjusting unit so that the quantity of light emitted from the first light source when reproducing the first high-density recording medium may be smaller than the quantity of light emitted from the first light source when reproducing the second high-density recording medium.

According to a fifth aspect of the present invention, there is provided an optical pickup including: a light source, a diffraction member for diffracting the laser beam emitted from the light source so that the diffraction efficiency of diffraction order for first high-density recording medium may be greater than the diffraction efficiency of diffraction order for second high-density recording medium, a focusing lens system for focusing diffraction lights of different diffraction orders diffracted by the diffraction member respectively on a information recording surface of the first high-density recording medium and on a information recording surface of the second high-density recording medium, and a light quantity adjusting unit for controlling the light source so that the quantity of light emitted from the light source when reproducing the first high-density recording medium may be smaller than the quantity of light emitted from the light source when reproducing the second high-density recording medium.

According to a sixth aspect of the present invention, there is provided an optical pickup including: a light source, a diffraction member for diffracting the laser beam emitted from the light source so that the diffraction efficiency of diffraction order for first high-density recording medium may be greater than the diffraction efficiency of diffraction order for second high-density recording medium, a focusing lens system for focusing diffraction lights of different diffraction orders diffracted by the diffraction member respectively on a information recording surface of the first high-density recording medium and on a information recording surface of the second high-density recording medium, and a light quantity adjusting unit for controlling the light source so that the quantity of light emitted from the light source when reproducing the first high-density recording medium may be smaller than the quantity of light emitted from the light source when reproducing the second high-density recording medium.

According to a seventh aspect of the present invention, there is provided an optical pickup including: a light source, a diffraction member for diffracting the laser beam emitted from the light, a focusing lenses for focusing diffraction lights of different diffraction orders diffracted by the diffraction member respectively on a information recording surface of high-density recording medium having a first recording density, and on a information recording surface of low-density recording medium having a second recording density smaller than the first recording density, and a light quantity adjusting unit for controlling the light source so that the quantity of light emitted from the light source when reproducing the high-density recording medium may be smaller than the quantity of light emitted from the light source when reproducing the low-density recording medium.

According to the invention, by noticing the quantity of exit light of light source, the optical pickup is proposed in a configuration depending on the purpose of use, such as reflectivity of the optical disc to be used, recording in such optical disc, or reproducing from such optical disc, and when corresponding to a high-density disc (BD or HD DVD) of higher density than a low-density disc (CD or DVD), load to the semiconductor laser as important element of optical pickup can be reduced, and its reliability can be enhanced.

BRIEF DESCRIPTION OF THE DRAWINGS

These and other aspects and features of the present invention will become clear from the following description taken in conjunction with the embodiments thereof with reference to the accompanying drawings, in which:

FIG. 2A is a schematic view showing a diffraction grating integrated type objective lens in the first embodiment of the invention, showing a state corresponding to second high-density disc;

FIG. 2B is a schematic view showing a diffraction grating integrated type objective lens in the first embodiment of the invention, showing a state corresponding to first high-density disc;

DETAILED DESCRIPTION OF THE INVENTION

Figure 1:
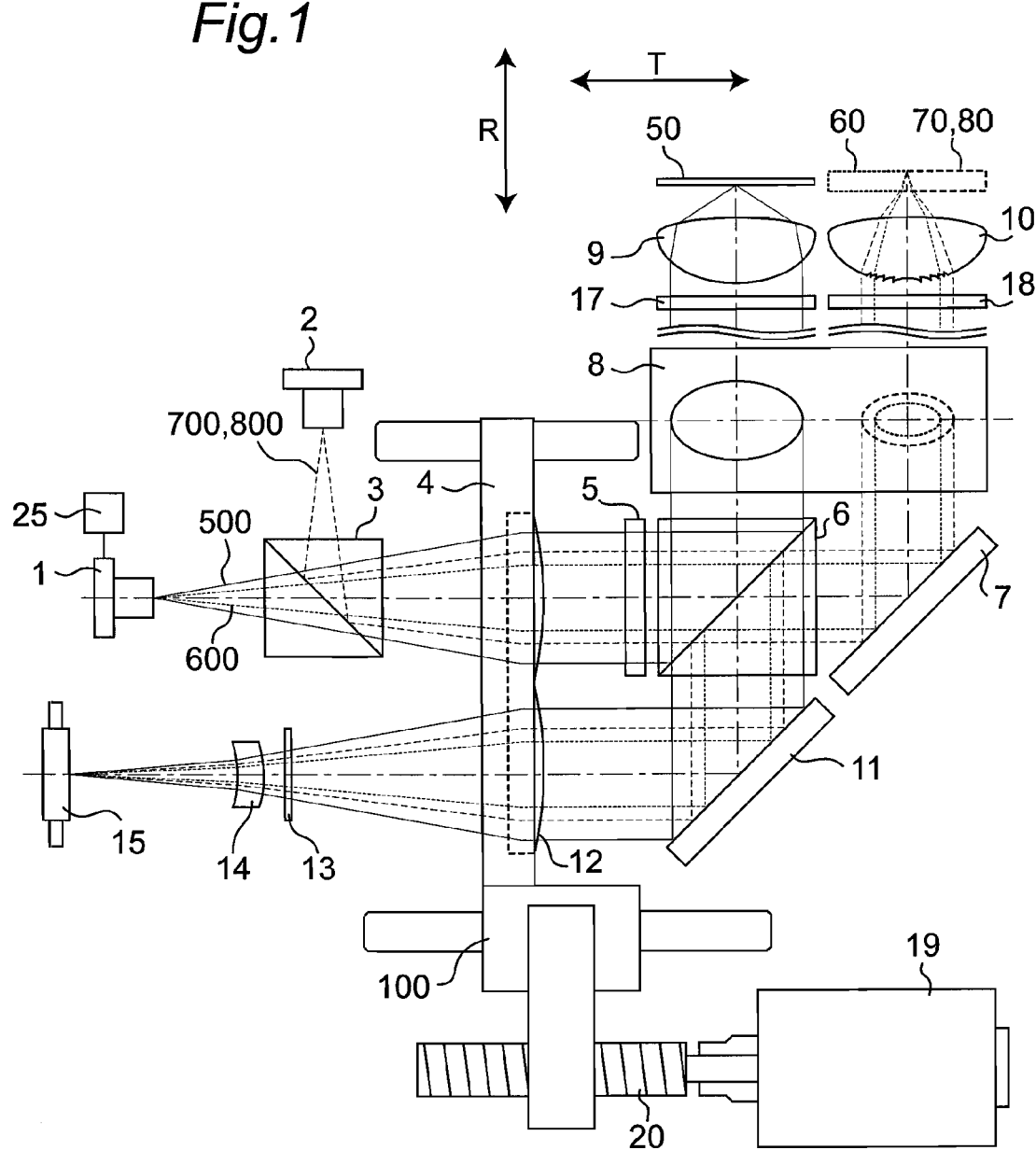
FIG. 1 is a schematic view showing an optical pickup according to a first embodiment of the invention.

Before the description of the present invention proceeds, it is to be noted that like parts are designated by like reference numerals throughout the accompanying drawings.

Embodiments of the present invention including the optical pickup, optical disc device, computer, optical disc player, and optical disc recorder are specifically described below while referring to the accompanying drawings.

First Embodiment

FIG. 1 is a schematic view of an optical pickup according to a first embodiment of the invention. This optical pickup is a pickup for recording or reproducing plural kinds of discs, and has plural optical systems corresponding to respective kinds of discs.

For the sake of convenience, in the specification, the optical path from the first and second light sources 1, 2 until reaching the recording surface of optical discs 50, 60, 70, 80 is called a forward path optical system, and the optical path of the light reflected by the optical discs 50, 60, 70, 80 until reaching the light detector 15 is called a backward path optical system.

In FIG. 1, the optical pickup is configured by the following components. The first light source 1 emits blue-violet laser beam in wavelength of 390 nm to 420 nm (wavelength is 405 nm in this embodiment). The second light source 2 emits red laser beam (wavelength is 660 nm) or infrared laser beam (wavelength is 780 nm). The light emitted from the first and second light sources enter a dichroic mirror 3. The dichroic mirror 3 passes laser beam of wavelength of 405 nm, and reflects laser beam of wavelength of 660 nm, 780 nm. Reflection and transmission depending on the wavelength of laser beam may be inverted in relation, and in such a case, hence, the configuration of first light source 1 and second light source 2 entering the dichroic mirror 3 in FIG. 1 may be inverted.

The collimator lens 4 converts the laser beam passing through the dichroic mirror 3 (wavelength 405 nm, 660 nm, 780 nm) into parallel light. A polarization converting element 5 is a member for rotating a polarization direction of laser beam by 90 degrees, and is made of liquid crystal or the like. A polarized beam splitter 6 changes over branching of optical path by the polarization direction of laser beam. A deflection mirror 7 is a mirror for deflecting the laser beam 600 passing through the polarized beam splitter 6 to an upward mirror 8. The upward mirror 8 is a mirror for elevating the laser beam 500 reflected by the polarized beam splitter 6 and the laser beam 600 passing through the polarized beam splitter 6 and reflected by the deflection mirror 7 into a perpendicular direction. A first objective lens 9 for first high-density disc and a second objective lens 10 for first high-density disc and low-density disc are designed to focus the passing laser beam onto the disc recording surface. As mentioned below, the second objective lens is provided with a diffraction grating to be applicable to the second high-density disc and first and second low-density discs.

A quarter-wavelength plate 17 is to polarize blue-violet laser beam, and a quarter-wavelength plate 18 is to polarize blue-violet laser beam, red and infrared laser beam. The laser beams polarized by the quarter-wavelength plates 17, 18 pass through the polarized beam splitter 6 to convert the reflection and transmission characteristic between the forward path optical system and backward path optical system, and thus all of the polarized laser beam reach a deflection mirror 11. A focusing lens for detection 12 focuses the laser beam, and a diffraction grating for detection 13 generates a signal for tracking control. A detection lens 14 generates astigmatism for focus control. A light detector 15 receives the laser beam.

A lens moving device 100 is a device for moving the collimator lens 4 and focusing lens for detection 12 simultaneously along the optical axis direction. A collimator lens driving actuator 19 configuring the lens moving device 100 moves the collimator lens 4. The collimator lens driving actuator 19 is provided with a drive shaft 20, which is coupled to a frame of the collimator lens. As the drive shaft rotates, the frame moves along the drive shaft. A light quantity adjusting unit 25 is a member for adjusting the quantity of light of first light source. The first light source is configured by a semiconductor laser, and the quantity of light varies depending on the magnitude of supplied current. That is, the light quantity adjusting unit 25 adjusts the magnitude of the current applied to the first light source.

Reference numeral 50 is a first high-density disc, which is an optical disc of about 0.1 mm in protective substrate thickness for focusing at NA 0.85, and 60 is a second high-density disc, which is an optical disc of about 0.6 mm in protective substrate thickness for focusing at NA 0.65. Generally, the recording density of information is higher in the first high-density disc 50 than in the second high-density disc 60. Reference numeral 70 is a first low-density disc, which is an optical disc of about 0.6 mm in protective substrate thickness for focusing at NA 0.60, and 80 is a second low-density disc, which is an optical disc of about 1.2 mm in protective substrate thickness for focusing at NA 0.45. In FIG. 1, the discs are mounted corresponding to the first and second objective lens 9, 10 respectively, but only one disc can be recorded or reproduced at one time.

Referring first to FIG. 1, operation of optical pickup 30 for recording or reproducing information on the first high-density disc 50 is explained. A blue-violet laser beam 500 of wavelength 405 nm emitted from the first light source 1 passes through the dichroic mirror 3, and is converted into substantially parallel light in the collimator lens 4, and reaches the beam splitter 6 without being polarized by the polarization converting element 5. The beam splitter 6 reflects the laser beam 500. The laser beam reflected by the beam splitter 6 passes through the upward mirror 8, and is focused as light spot on the information recording surface of the first high-density disc 50 over the protective substrate by the objective lens 9.

The blue-violet laser beam of the backward path reflected by the information recording surface of the first high-density disc 50 passes through the objective lens 9 and quarter-wavelength plate 17 via the same optical path as forward path, and returns to a straight polarized light which polarization direction is orthogonal to that of forward path, and is reflected by the upward mirror 8 to be bent in the optical path, and reaches the beam splitter 6. Since the laser beam 500 is a straight polarized light which polarization direction is orthogonal to that of forward path, and hence passes through the beam splitter 6. The laser beam passing through the beam splitter 6 is reflected by the deflection mirror 11, passes through the diffraction grating for detection 13, and is provided with a specified astigmatism on the detection lens 14, and is guided into the light detector 15, and generates the information signal and servo signal.

In the first high-density disc 50, a spherical aberration on the focused spot may be generated depending on the deviation of substrate thickness, and recording or reproducing performance may be deteriorated. With the move of the collimator lens 4 by the lens moving device 100, the collimated laser beam is a ray of weak diverging or weak converging. When laser beam of weak diverging or weak converging is focused on the recording surface of the first high-density disk 50 by the objective lens 9, a spot of spherical aberration is formed, and with this spherical aberration, the spherical aberration due to deviation of substrate thickness may be corrected. When the collimator lens 4 of the forward path is driven, the focusing lens for detection 12 in the returning route is moved at the same time. Therefore the shape of the spot on the light detector 15 is almost always maintained.

Next, operation of optical pickup 30 for recording or reproducing information in the second high-density disc 60 is explained. A blue-violet laser beam 600 of wavelength 405 nm emitted from the first light source 1 passes through the dichroic mirror 3, and is converted into substantially parallel light in the collimator lens 4. The polarization converting element 5 adjusts polarization of laser beam 600 so that the direction of polarization may rotate by 90 degrees in order to pass through the beam splitter 6. The laser beam passing through the beam splitter 6 reaches the deflection mirror 7 and upward mirror 8 to be bent in optical path, and is focused by the objective lens 10 as light spot on the information recording surface of the second high-density disc 60 over the protective substrate.

The blue-violet laser beam of the backward path reflected by the information recording surface of the second high-density disc 60 passes through the same optical path as the forward path to return to substantially parallel light by the objective lens 10, and returns to a straight polarized light which polarization direction is orthogonal to that of direction of polarization immediately before entering the quarter-wavelength plate 18 on quarter wavelength plate 18, and the deflection mirror 7 to be bent in optical path, thereby reaching the beam splitter 6. Since the laser beam 600 is changed in the direction of polarization, the laser beam 600 is reflected by the beam splitter 6, and passes through the diffraction grating for detection 13, and is provided with a specified astigmatism on the detection lens 14, and is guided into the light detector 15, and the information signal and servo signal are generated by the light detector 15.

Depending on the design of the objective lens 10, the luminous flux after passing the collimator lens 4 in the forward path may not be limited to parallel light, but may be light of weak diverging or weak converging. Further, depending on the combination with the objective lens 10, it may be designed to decrease the spherical aberration on the recording surface of the second high-density disc 60.

Same as in the case of the first high-density disc 50, with the move of the collimator lens 4 by the lens moving device 100, the luminous flux after passing through the collimator lens 4 may be changed in the diverging or converging state, and the light may be focused by the objective lens on the recording surface of the second high-density disc 60, so that spherical aberration due to deviation of substrate thickness of the second high-density disc 60 may be corrected.

As for the focus error signal for recording or reproducing the first high-density disc 50 or second high-density disc 60, a method of astigmatism may be applied, that is, the focusing spot provided with astigmatism on the detection lens 14 is detected by four-division pattern in the light detector 15. As for the tracking error signal a so-called three-beam method or differential push-pull (DPP) method may be applied with main beam and sub-beam produced by diffraction grating 13.

The light received in the light receiver of the light detector 15 is generally converted into an electric signal, and the converted electric signal is outputted from a terminal. In the configuration of the optical pickup of the present invention, as compared with the case of reproduction of ROM disc in which data is recorded preliminarily or write-once R disc, such as first high-density disc 50 or second high-density disc 60, when reproducing the two-layer disc of programmable RE disc as first high-density disc 50, the quantity of light of luminous flux in the backward path reaching the light receiver of the light detector 15 is small. In addition, as compared with the case of reproduction of ROM disc or R disc, such as first high-density disc 50 or second high-density disc 60, when recording in the first high-density disc 50, the quantity of light of luminous flux in the backward path reaching the light receiver of the light detector 15 is large.

Figure 5:
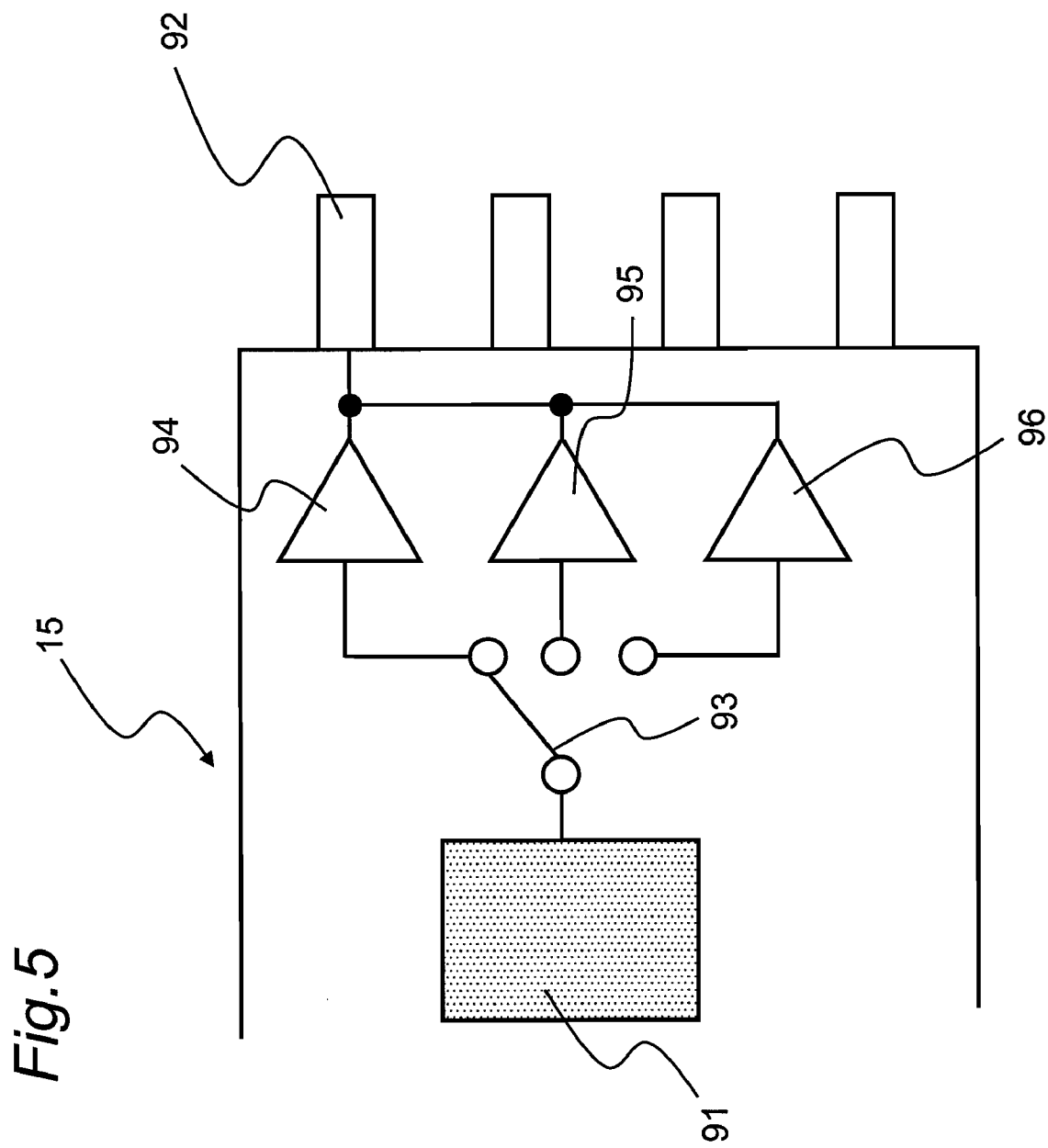
FIG. 5 is a schematic view of inside of light detector in each embodiment of the invention.

The light detector 15 is desirably provided with, as shown in FIG. 5, a switch 93 for sending the electric signal received and converted in the light receiver 91 to an output terminal 92, and a changeover type amplifier circuit group. In such configuration, when reproducing the two-layer disc of RE disc small in the quantity of light reaching up to the light receiver, the amplification rate (gain) is changed over to a higher circuit 94, and when recording in the first high-density disc large in the quantity of light reaching up to the light receiver, the amplification rate (gain) is changed over to a lower circuit 96. When reproducing the R disc or ROM disc or when reproducing the high-density disc, the amplification rate (gain) is changed over to an intermediate circuit 95. Therefore, regardless of the type of discs to be recorded or reproduced, the magnitude of electric signal outputted from the signal output terminal of the light detector 15 is kept within a specified range. In such configuration, in the circuit for receiving the electric signal outputted from the light detector 15, and producing control signal or reproduced signal, the input allowable signal level of signal input unit can be narrowed, and a more stable signal can be generated, and the circuit scale can be reduced.

Further, operation of optical pickup 30 for recording or reproducing information in the first and second low-density discs 70, 80 is explained. A red laser beam 700 of wavelength 660 nm or infrared laser beam 800 of wavelength 780 nm emitted from the second light source 2 is reflected in the dichroic mirror 3, and is converted into substantially parallel light in the collimator lens 4, and reaches the beam splitter 6 without being polarized in the polarization converting element 5. The laser beam 700 or 800 passes through the beam splitter 6. The laser beam 700 or 800 passing through the beam splitter 6 is bent in the optical path in the deflection mirror 7 and upward mirror 8, and is focused by the objective lens 10 as light spot on the information recording surface of the first and second low-density discs 70, 80 over the protective substrate. Operation in the objective lens 10 is different, and is specifically explained below.

The laser beam 700 or 800 of the backward path reflected by the information recording surface of the first or second low-density disc 70 or 80 returns to substantially parallel light in the objective lens 10 via the same optical route as the forward path, and returns to a straight polarized light which polarization direction is orthogonal to that of direction of polarization immediately before entering quarter-wavelength plate 18 in the quarter-wavelength plate 18, and is bent in optical path in the deflection mirror 7, thereby reaches the beam splitter 6. Since the laser beam 600 is changed in the direction of polarization, the laser beam 600 is reflected in the beam splitter 6, and passes through the grating 13, and is provided with a specified astigmatism on the detection lens 14, and is guided into the light detector 15, and the information signal and servo signal is generated in the light detector 15.

Depending on the design of the objective lens 10, the luminous flux after passing the collimator lens 4 in the forward path may not be limited to parallel light, but may be light of weak diverging or weak converging. Further, depending on the combination with the objective lens 10, the laser beam 700 or 800 may be designed to decrease the spherical aberration on the recording surface of the first or second low-density disc 70 or 80.

Function of a diffraction grating integrated type objective lens 10 is specifically described by referring to FIG. 2A and FIG. 2B. A blazed type diffraction structure of sawtooth wave section is formed on at least one side of the diffraction grating integrated type objective lens 10 as shown in FIG. 2A, in order to correspond respectively to second high-density disc 60, first low-density disc 70, and second low-density disc 80 on the diffraction grating integrated type objective lens 10. In the embodiment, the blazed type diffraction structure is provided at the incident side (the light source side) of the objective lens.

The blazed type diffraction structure is corrected in aberration so as to converge the laser beam of each wavelength up to the diffraction limit in the second high-density disc 60, first low-density disc 70, and second low-density disc 80 to be recorded or reproduced by laser beam of each wavelength, together with the power of refraction of diffraction grating integrated type objective lens 10. A light spot of diffraction limit on each optical disc of different substrate thickness can be formed on the diffraction grating integrated type objective lens 10 thus having the blazed type diffraction grating for diffracting part of incident light. As a region for converging the infrared laser beam in the second low-density disc 80, the central part including the optical axis is used. As a region for converging the blue-violet laser beam or red laser beam in the second high-density disc 60 or first low-density disc 70, both the central part and the peripheral part are designed to be used. Therefore, the NA to the second low-density disc may be limited to about 0.45, and the NA to the second high-density disc 60 or first low-density disc 70 may be extended to about 0.65.

The diffraction grating integrated type objective lens 10 is not limited to the structure of objective lens having the blazed type diffraction structure formed on the incident plane as shown in FIG. 2A, but may be formed as shown in FIG. 2B, in which an objective lens 10a of refractive type positive power, and a separate hologram lens 10b are driven integrally, and the second high-density disc 60, first low-density disc 70, and second low-density disc 80 may be recorded or reproduced. When such separate hologram lens is used, it is not required to form a diffraction structure on the lens surface of large inclination angle, and it is easy to manufacture the die.

In the embodiment, the polarization converting element 3 is configured by a liquid crystal or transparent piezoelectric element, but it may be also configured by a wavelength plate type actuator in a configuration designed to insert or extract the wavelength plate in the optical path, or exchange wavelength plate and transparent plate in the optical path. Note that the detailed description of the wavelength plate type actuator is omitted. When the wavelength plate is half wavelength plate, an effect of the present invention is efficiently exhibited. However, the configuration of the wavelength plate is not limited thereto.

In the embodiment, the first high-density disc 50 is recorded or reproduced, and the second high-density disc 60 is reproduced. In this case, the light output emitted from the first light source 1 is greater when the optical path is changed over to guide the laser beam to the objective lens 10 for reproducing the second high density-disc 60, than when the optical path is changed over to guide the laser beam to the objective lens 9 for reproducing the first high density-disc 50. Adjustment of light output emitted from the first light source 1 is controlled by the light quantity adjusting unit 25.

In such configuration, the diffraction efficiency of blue-violet laser beam of diffraction grating of the objective lens 10 can be lowered. Therefore, the diffraction efficiency of red or infrared laser beam by diffraction grating provided in the objective lens 10 can be enhanced, and when recording the first and second low-density discs 70, 80, a sufficient quantity of light on the recording surface can be assured. As a result, the first and second low-density discs 70, 80 are applicable to recording of higher speed.

For example, when the diffraction grating of the objective lens 10 is formed so that the diffraction efficiency of the blue-violet laser beam may be 80%, the diffraction efficiency of red laser beam is 80%, and the diffraction efficiency of infrared laser beam is 60% (all by scalar calculation, same hereinafter). In this case, in particular, since the diffraction efficiency in infrared laser beam is low, high-seed recording of second low-density disc 80 is difficult.

When the diffraction efficiency is formed so that the diffraction efficiency of the blue-violet laser beam of diffraction grating provided in the objective lens may be 50%, the diffraction efficiency of red laser beam may be enhanced to 95%, and the diffraction efficiency of infrared laser beam may be 85%. In this case, when recording the first and second low-density discs 70, 80, the quantity of exit light from the second light source 2 may be transmitted to the recording surface of the optical disc at higher efficiency, and it is applicable to recording of higher speed. The first light source 1 can emit light output to the first high-density disc 50. Generally, the light output when recording the optical disc is usually more than 10 to 20 times of reproducing mode. According to this configuration, the first light source 1 may assure a sufficient quantity of light on the recording surface of the second high-density disc 60 for reproducing only with the objective lens 10 of low diffraction efficiency in a light output range of continuous output.

In the embodiment, the material of the objective lenses 9, 10 is preferred to be glass. In such configuration, an optical pickup of high reliability is realized, being free from disturbance in material transmissivity or wavefront aberration by irradiation with blue-violet semiconductor laser, or deterioration of material due to blue-violet light. In the configuration shown in FIG. 2, with the same reason, the material of the diffractive lens 21 is preferred to be glass, but since the luminous flux passing through this diffractive lens 21 is not focused, the luminous flux is lower as compared with that of the surface facing the optical disc 50 or 60 of the objective lens 10, and effect of deterioration by blue-violet light is smaller, and hence a resin material may be also used.

Figure 4A:
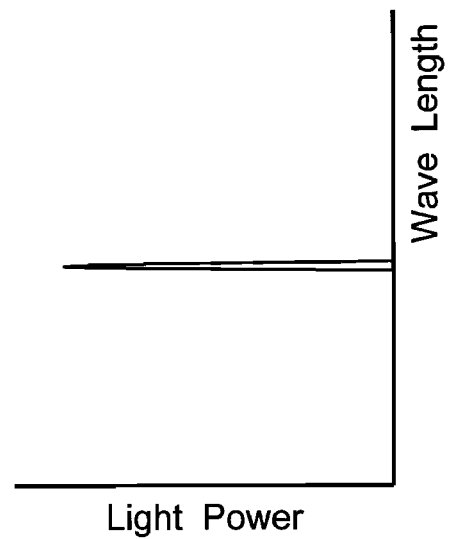
FIG. 4A, FIG. 4B, and FIG. 4C are conceptual views of wavelength spectrum of semiconductor laser of light source in the first and second embodiments of the invention.
Figure 4B:
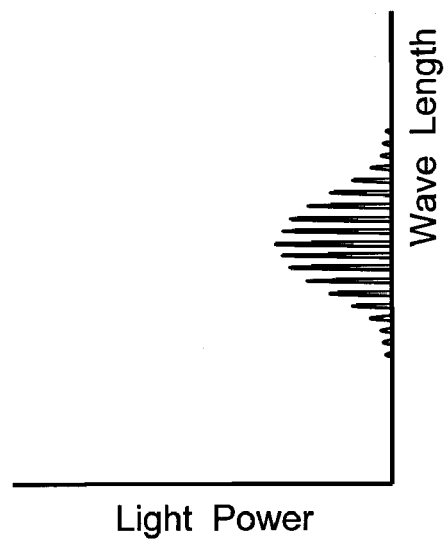
Figure 4C:
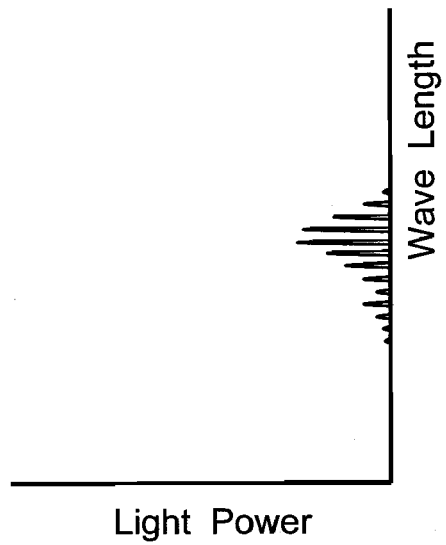

Generally, in an optical disc recording and reproducing apparatus, semiconductor laser generates noise due to return light from the optical disc. By lowering the coherence by spreading the spectrum of semiconductor laser, it is known that the noise can be decreased. In one of such methods, high output laser is used for spreading the spectrum by superimposing high frequency signal components on the driving current of the semiconductor laser, which is known as recording type optical disc device. FIG. 4A, FIG. 4B, and FIG. 4C are conceptual views of wavelength spectrum of semiconductor laser as the first light source 1 in the embodiment, in which the axis of abscissas denotes the wavelength and the axis of ordinates represents the light intensity. FIG. 4A shows a spectrum mode of general blue-violet semiconductor laser without superimposing high frequency signal components, and generally it is substantially a single mode. When high frequency signal components are superimposed, the spectrum becomes as shown in FIG. 4B, and the spectrum is spread widely. In FIG. 4C, the blue-violet semiconductor laser in FIG. 4A is emitted at high output, showing a spectrum mode without superimposing high frequency signal components. In FIG. 4C, the spectrum is spread widely although high frequency components are not superimposed. The spectrum spreading mode is not smooth as compared with FIG. 4B in which high frequency signal components are superimposed in low output mode, but as compared with the single wavelength mode, the spectrum is evidently spread widely, and a similar effect when high frequency signal components are superimposed may be expected. In the first embodiment, such phenomenon was observed when the light output was raised by more than about five times from the light output for reproducing the usual first high-density disc 50. As in FIG. 4C, the spectrum is spread without superimposing high frequency signal components, and it means that the noise generated by return light can be lowered without superimposing the high frequency signal components. That is, in the optical pickup using the configuration of the invention, when reproducing the second high-density disc 60, it is not necessary to superimpose the high frequency signal components particularly, and it is desired to stop operation of the circuit for superimposing the high frequency signal components in the exit light from the first light source 1. In such configuration, it has a great merit of decreasing the radiation of undesired electromagnetic waves and others. Further, by enhancing the light output, quantum noise characteristic of semiconductor laser (known as relative intensity noise or RIN) can be decreased. The configuration of the optical pickup of the invention is very effective also from the viewpoint of noise reduction in semiconductor laser. This effect is obtained simultaneously whether the first high-density disc 50 is for reproducing only, or for reproducing and recording.

Second Embodiment

Figure 3:
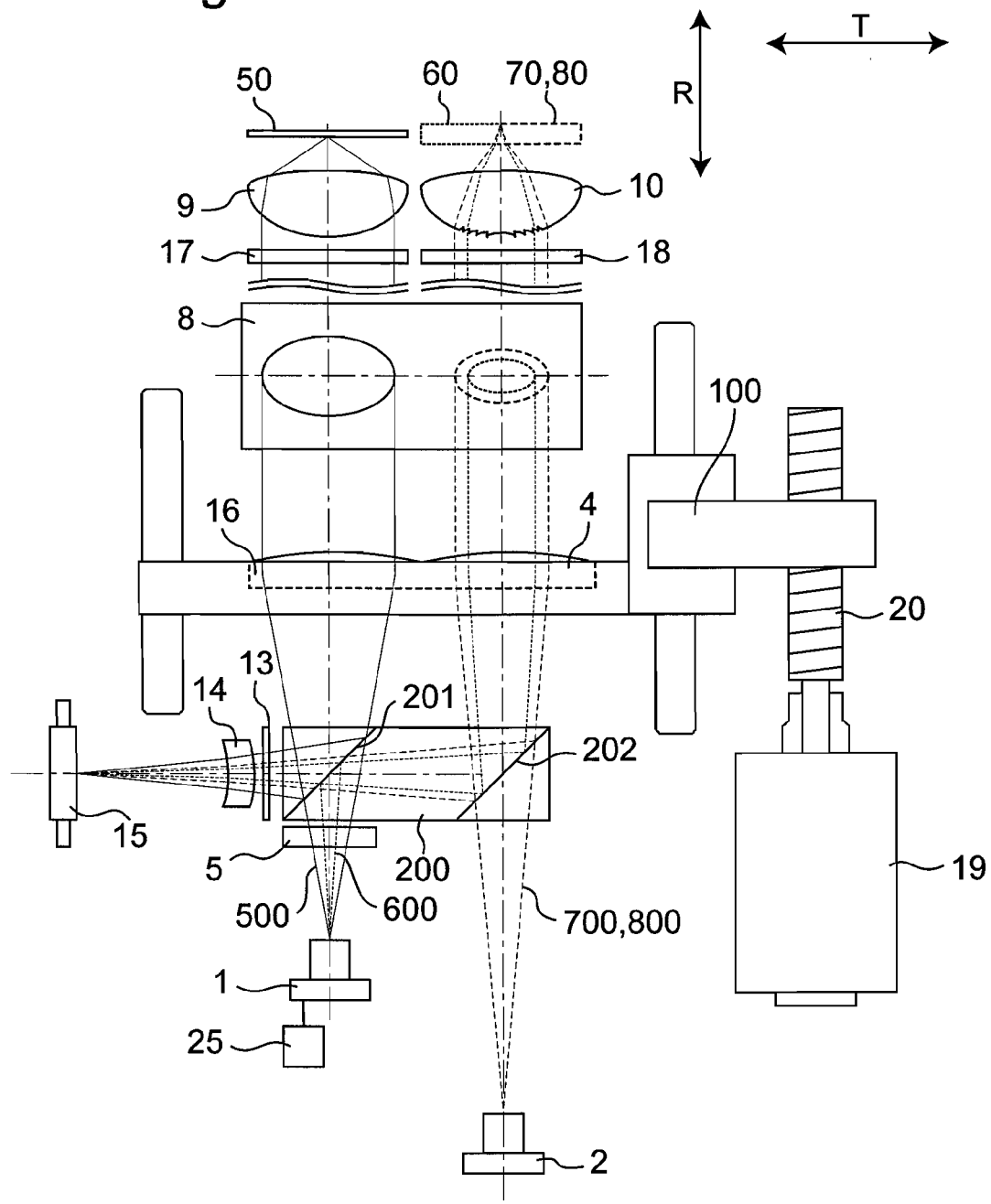
FIG. 3 is a schematic view showing an optical pickup for recording or reproducing a first high-density disc according to a second embodiment of the invention.

FIG. 3 is a schematic view of an optical pickup in another embodiment of the invention. In FIG. 3, same parts as in the first embodiment are identified with same reference numerals.

A first light source 1 emits blue-violet laser beam in wavelength of 390 nm to 420 nm (wavelength is 405 nm in this embodiment). A second light source 2 emits red or infrared laser beam (wavelength 660 nm, 780 nm). The light beams emitted from the first and second light sources 1, 2 enter a prism 200. The prism 200 has two reflection planes. A first reflection plane 201 of the prism 200 separates laser beam of wavelength of 405 nm depend on that polarization, and totally passes laser beam of wavelength of 660 nm and 780 nm. A second reflection plane 202 of the prism 200 totally reflects laser beam of wavelength of 405 nm, and separates laser beam of wavelength of 660 nm and 780 nm depend on that polarization.

A collimator lens 4 as an example of first coupling lens converts the laser beam passing through the prism 200 (wavelength 405 nm, 660 nm, 780 nm) into parallel light. A collimator lens 16 as an example of second coupling lens converts the laser beam passing through the prism 200 (wavelength 405 nm) into parallel light. A polarization converting element 5 is a member for rotating the direction of polarization of laser beam by 90 degrees, and it is configured by, for example, liquid crystal. An upward mirror 8 is a mirror for elevating the laser beam passing through the prism in a vertical direction. A first objective lens 9 for first high-density disc and a second objective lens 10 for second high-density disc and low-density disc are for focusing the laser beam on the recording surface. As mentioned below, the second objective lens is provided with a diffraction grating to correspond to the second high-density disc and first and second low-density discs.

The configuration of the second objective lens 10 for corresponding to second high-density disc 60, first low-density disc 70, and second low-density disc 80 is not limited to sawtooth wave blazed diffraction grating, but may be realized by phase difference structure, staircase diffraction grating, or rectangular diffraction grating.

A quarter-wavelength plate 17 is to polarize blue-violet laser beam, and a quarter-wavelength plate 18 is to polarize blue-violet laser beam, red and infrared laser beam. A diffraction grating for detection 13 generates a sub beam for signal for tracking control. A detection lens 14 generates astigmatism for focus control. A light detector 15 receives the laser beam.

A lens moving device 100 is a device for moving the collimator lenses 4, 16 simultaneously along the optical axis direction. A collimator lens driving actuator 19 configuring the lens moving device 100 moves the collimator lens 4. The collimator lens driving actuator 19 is provided with a drive shaft 20, which is coupled to a frame 100 of the collimator lens. As the drive shaft rotates, the frame moves along the drive shaft. A light quantity adjusting unit 25 is a member for adjusting the quantity of light of first light source. The first light source is configured by semiconductor laser, and the quantity of light varies depending on the magnitude of supplied current. That is, the light quantity adjusting unit 25 adjusts the magnitude of the current applied to the first light source.

Reference numeral 50 is a first high-density disc, which is an optical disc of about 0.1 mm in protective substrate thickness for focusing at NA 0.85, and 60 is a second high-density disc, which is an optical disc of about 0.6 mm in protective substrate thickness for focusing at NA 0.65. Generally, the recording density of information is higher in the first high-density disc 50 than the recording density of information in the second high-density disc 60. Reference numeral 70 is a first low-density disc, which is an optical disc of about 0.6 mm in protective substrate thickness for focusing at NA 0.60, and 80 is a second low-density disc, which is an optical disc of about 1.2 mm in protective substrate thickness for focusing at NA 0.45. In FIG. 1, the discs are mounted simultaneously corresponding to the first and second objective lens 9, 10 respectively, but only one disc can be recorded or reproduced at one time.

Referring first to FIG. 3, operation of optical pickup 30 for recording or reproducing information in the first high-density disc 50 is explained. A blue-violet laser beam 500 of wavelength 405 nm emitted from the first light source 1 is rotated in the direction of polarization by 90 degrees by the polarization converting element 5, and passes through the first reflection plane 201 of the prism 200, and is converted into substantially parallel light by the collimator lens 16. Further, the laser beam 500 reflects by the upward mirror 8, and is focused by the objective lens 9 as light spot on the information recording surface of the first high-density disc 50 over the protective substrate.

The blue-violet laser beam of the backward path reflected by the information recording surface of the first high-density disc 50 returns to the objective lens 9 via the same optical path as the forward path, and passes through the quarter-wavelength plate 17, and is converted to a straight polarized light which polarization direction is orthogonal to that of forward path, and is reflected by the upward mirror 8 to be bent in the optical path, and sent into the collimator lens 16 to become a converted light, and reaches the prism 200. Since the laser beam 500 is a straight polarized light which polarization direction is orthogonal to that of forward path, and hence the laser beam 500 is reflected by the first reflection plan 201 of the prism 200. The laser beam 500 passing through the prism 200 passes through the diffraction grating for detection 13, and is provided with a specified astigmatism on the detection lens 14, and is guided into the light detector 15, and the information signal and servo signal are generated by the light detector 15.

A spherical aberration on the focused spot may be generate by the first high-density disc 50 depending on the deviation of substrate thickness, and recording or reproducing performance may be deteriorated. With the move of the collimator lens 16 by the lens moving device 100, the collimated laser beam is a ray of weak diverging or weak converging. When laser beam of weak diverging or weak converging is focused on the recording surface of the first high-density disk 50 by the objective lens 9, a spot of spherical aberration is formed, and with this spherical aberration, the spherical aberration due to deviation of substrate thickness may be corrected. When the collimator lens 16 is driven, the collimator lens 16 acts on the optical path of the backward path. Therefore, the shape of the spot on the light detector 15 is almost always maintained.

Next, operation of optical pickup 30 for recording or reproducing information in the second high-density disc 60 is explained. A blue-violet laser beam 600 of wavelength 405 nm emitted from the first light source 1 reaches the polarization converting element 5 and reaches the prism 200 without being converted in polarization. In the prism 200, the blue-violet laser beam 600 is reflected by the first reflection plane 201 to be bent in the optical path, and it is further reflected by the second reflection plane 202 to be bent in the optical path, and it is converted into substantially parallel light in the collimator lens 4, and the optical path is bent by the upward mirror 8, and a circular polarized light is formed by the quarter-wavelength plate 18, and a light spot is focused by the objective lens 10 on the information recording surface of the second high-density disc 60 over the protective substrate.

The blue-violet laser beam of the backward path reflected by the information recording surface of the second high-density disc 60 returns to substantially parallel light in the objective lens 10 via the same optical path as the forward path, and is converted to a straight polarized light which polarization direction is orthogonal to that of direction of polarization immediately before entering the quarter-wavelength plate 18 in the quarter-wavelength plate 18, and is reflected by the upward mirror 8 to be bent in optical path, and is converted to converging light by the collimator lens 4, and is reflected by the second reflection plane 202 of the prism 200 to be bent in the optical path, and the blue-violet laser beam further passes through the first reflection plane 201, and passes through the diffraction grating for detection 13, and is provided with a specified astigmatism by the detection lens 14, and is guided into the light detector 15, and the information signal and servo signal are generated by the light detector 15.

Depending on the design of the objective lens 10, the luminous flux after passing the collimator lens 4 in the forward path may not be limited to parallel light, but may be light of weak diverging or weak converging. Further, depending on the combination with the objective lens 10, the spherical aberration may be designed to be decreased on the recording surface of the second high-density disc 60.

Same as in the case of the first high-density disc 50, with the move of the collimator lens 4 by the lens moving device 100, the luminous flux after passing through the collimator lens 4 may be changed in the diverging or converging state, and the light may be focused by the objective lens on the recording surface of the second high-density disc 60, so that spherical aberration due to deviation of substrate thickness of the second high-density disc 60 may be corrected.

As for the focus error signal for recording or reproducing the first high-density disc 50 or second high-density disc 60, a method of astigmatism may be applied, that is, a focusing spot provided with astigmatism by the detection lens 14 is detected by four-division pattern in the light detector 15. As for the tracking error signal, a so-called three-beam method or differential push-pull (DPP) method may be applied, with main beam and sub-beam produced by diffraction grating 13.

Further, operation of optical pickup 30 for recording or reproducing information in the first and second low-density discs 70, 80 is explained. A red laser beam 700 of wavelength 660 nm or infrared laser beam 800 of wavelength 780 nm emitted from the second light source 2 passes through the second reflection plane 202 of the prism 200, and is converted into substantially parallel light in the collimator lens 4, and is bent in the optical path by the upward mirror 8, and is formed into a circular polarized light by the quarter-wavelength plate 18, and is focused by the objective lens 10 as light spot on the information recording surface of the first and second low-density discs 70, 80 over the protective substrate.

The laser beam 700 or 800 of the backward path reflected by the information recording surface of the first or second low-density disc 70 or 80 returns to substantially parallel light in the objective lens 10 via the same optical path as the forward path, and is converted to a straight polarized light which polarization direction is orthogonal to that of direction of polarization immediately before entering the quarter-wavelength plate 18 on quarter-wavelength plate 18, and the laser beam 700 or 800 is bent in optical path by the upward mirror 8, and is converted to converging light by the collimator lens 4, and is reflected by the second reflection plane 202 of the prism 200 to be bent in the optical path, and passes through the first reflection plane 201, and passes through the diffraction grating for detection 13, and is provided with a specified astigmatism by the detection lens 14, and is guided into the light detector 15, and the information signal and servo signal are generated by the light detector 15.

Depending on the design of the objective lens 10, the luminous flux after passing the collimator lens 4 in the forward path may not be limited to parallel light, but may be light of weak diverging or weak converging. Further, depending on the combination with the objective lens 10, the spherical aberration may be designed to be decreased on the recording surface of the first or second low-density disc 70 or 80. Function of a diffraction grating integrated type objective lens 10 is same as in the first embodiment. A blazed type diffraction structure being sawtooth wave section is formed on at least one side of the diffraction grating integrated type objective lens 10 as shown in FIG. 2A, in order to correspond respectively to second high-density disc 60, first low-density disc 70, and second low-density disc 80 on the diffraction grating integrated type objective lens 10. In the embodiment, the blazed type diffraction structure is provided at the incident side (the light source side) of the objective lens.

The blazed type diffraction structure is corrected in aberration so as to converge the laser beam of each wavelength up to the diffraction limit in the second high-density disc 60, first low-density disc 70, and second low-density disc 80 to be recorded and reproduced corresponding to the laser beam of each wavelength, together with the refraction lens power of diffraction grating integrated type objective lens 10. The diffraction grating integrated type objective lens 10 thus having the blazed type diffraction grating for diffracting part of incident light is capable of forming a light spot of diffraction limit on each optical disc of different substrate thickness. As a region for converging the infrared laser beam in the second low-density disc 80, the central part including the optical axis is limited to, and as a region for converging the blue-violet laser beam or red laser beam in the second high-density disc 60 or first low-density disc 70, both the central part and the peripheral part are designed to be used. Therefore, the NA to the second low-density disc may be limited to about 0.45, and the NA to the second high-density disc 60 or first low-density disc 70 may be extended to about 0.65.

The diffraction grating integrated type objective lens 10 is not limited to the structure of objective lens having the blazed type diffraction structure formed on the incident plane as shown in FIG. 2A, but may be configured, for example, as shown in FIG. 2B, in which an objective lens of refractive type positive power, and a separate hologram lens are driven integrally, and the second high-density disc 60, first low-density disc 70, and second low-density disc 80 is recorded or reproduced. When such separate hologram lens is used, it is not required to form a diffraction structure on the lens surface of large inclination angle, and it is easy to manufacture the die.

In the embodiment, the first high-density disc 50 is recorded or reproduced, and the second high-density disc 60 is reproduced. In this case, preferably, the light output emitted from the first light source 1 is greater when the optical path is changed over to guide the laser beam to the objective lens 10 for reproducing the second high density-disc 60, than when the optical path is changed over to guide the laser beam to the objective lens 9 for reproducing the first high density-disc 50. Adjustment of light output emitted from the first light source 1 is controlled by the light quantity adjusting unit 25.

In such configuration, the diffraction efficiency of blue-violet laser beam of diffraction grating of the objective lens 10 can be lowered. Therefore, the diffraction efficiency of red or infrared laser beam by diffraction grating provided in the objective lens 10 can be enhanced, and when recording the first and second low-density discs 70, 80, a sufficient quantity of light on the recording surface can be assured. As a result, the first and second low-density discs 70, 80 are applicable to recording of higher speed.

For example, when the diffraction grating is formed so that the diffraction efficiency of the blue-violet laser beam may be 80%, the diffraction efficiency of red laser beam is 80%, and the diffraction efficiency of infrared laser beam is 60% (all by scalar calculation, same hereinafter). In this case, in particular, since the diffraction efficiency in infrared laser beam is low, high-seed recording of second low-density disc 80 is difficult.

When the diffraction efficiency is formed so that the diffraction efficiency of the blue-violet laser may be 50%, the diffraction efficiency of red laser beam may be enhanced to 95%, and the diffraction efficiency of infrared laser beam may be enhanced to 85%. In this case, when recording the first and second low-density discs 70, 80, the quantity of exit light from the second light source 2 may be transmitted to the recording surface of the optical disc at higher efficiency, and it is applicable to recording of higher speed. The first light source 1 can emit light output to the first high-density disc 50. Generally, the light output when recording the optical disc is usually more than 10 to 20 times of reproducing mode. According to this configuration, the first light source 1 may assure a sufficient quantity of light on the recording surface of the second high-density disc 60 for reproducing only with the objective lens 10 of low diffraction efficiency in a light output range of continuous output.

In the embodiment, decrease of quantity of light by diffraction efficiency less than 100% by the second high-density disc of the diffraction grating of second objective lens is compensated by increasing the light output emitted from the first light source 1 by the light quantity adjusting unit 25 so as to be equivalent to the efficiency as the quantity of light emitted to the first high-density disc 50. As a modified example, by extending the focal length of the second objective lens 60, the use efficiency of the light can be substantially increased. At this time, the light output of the first light source 1 may be set substantially the same by using the first high-density disc 50 and second high-density disc 60. For example, supposing the NA of the first objective lens to be 0.85, the NA of the second objective lens corresponding to the second high-density disc 60 to be 0.65, and the diffraction efficiency of blue-violet laser beam of the diffraction grating of the second objective lens to be 90%, the ratio is calculated by including the NA ratio and loss portion by diffraction efficiency, and the focal length of the second objective lens group to the blue-violet laser beam is increased to about 1.453 times of the focal length of the first objective lens.

That is, when compensating for decrease of quantity of light due to diffraction efficiency by the focal lengths of first and second objective lenses, the focal lengths of first and second objective lenses may be configured to satisfy the relation of formula (I). In such configuration, it is effective to make substantially equal the light output of the first light source 1 when using the first high-density disc and second high-density disc.

$$\eta \cdot f_1 \cdot NA_1 \cong f_2 \cdot NA_2 \quad (1)$$

where f1 is focal length of first objective lens, f2 is focal length of second objective lens group to blue-violet laser beam, NA1 is numerical aperture of first objective lens, NA2 is numerical aperture of second pair of objective lens group corresponding to second high density, and $\eta$ is diffraction efficiency of diffraction grating of second objective lens to blue-violet laser beam. Meanwhile, in the constitution using 0-order efficiency passing through the diffraction grating, its transmissivity may be regarded as 0-order diffraction efficiency, and may be included in the scope of $\eta$.

In the embodiment, the material of the objective lenses 9, 10 is preferred to be glass. In such configuration, an optical pickup of high reliability is realized, being free from disturbance in material transmissivity or wavefront aberration by irradiation with blue-violet semiconductor laser, or deterioration of material due to blue-violet light. In the configuration shown in FIG. 4, with the same reason, the material of the diffractive lens 21 is preferred to be glass, but since the luminous flux passing through this diffractive lens 21 is not focused, the luminous flux is lower as compared with that of the surface facing the optical disc 50 or 60 of the objective lens 10, and effect of deterioration by blue-violet light is smaller, and hence a resin material may be also used.

Also in the embodiment, the quantity of light on the recording surface is substantially equal in the first high-density disc and second high-density disc, but even if the required quantity of light differs in each recording surface, the constitution of the invention is valid in all cases by adjusting the ratio to be equal in the quantity of light on each recording surface.

For example, supposing the quantity of light on the recording surface of first high-density disc necessary for reproducing a single-layer disc of first high-density disc to be equal to the quantity of light on the recording surface of second high-density disc necessary for reproducing a single-layer disc of second high-density disc, the quantity of light on the recording surface is required about twice of single-layer disc on two-layer disc of first high-density disc. If the quantity of light on its recording surface is about twice of the single-layer disc on the two-layer disc of second high-density disc, the relation of light output of the first light source when using two-layer discs may be adjusted to the relation of the embodiment, so that the same effects as in the embodiment may be obtained.

Further, as compared with the quantity of light on the recording surface of first high-density disc necessary for reproducing a single-layer disc of first high-density disc, if the quantity of light on the recording surface of second high-density disc necessary for reproducing a single-layer disc of second high-density disc is substantially twice, when using these discs, the relation of light output of the first light source in the embodiment may be adjusted to the relation of the embodiment, in consideration of twice of ratio of quantity of light required for the condition of using the second high-density disc, so that the same effects as in the embodiment may be obtained.

Third Embodiment

Figure 6:
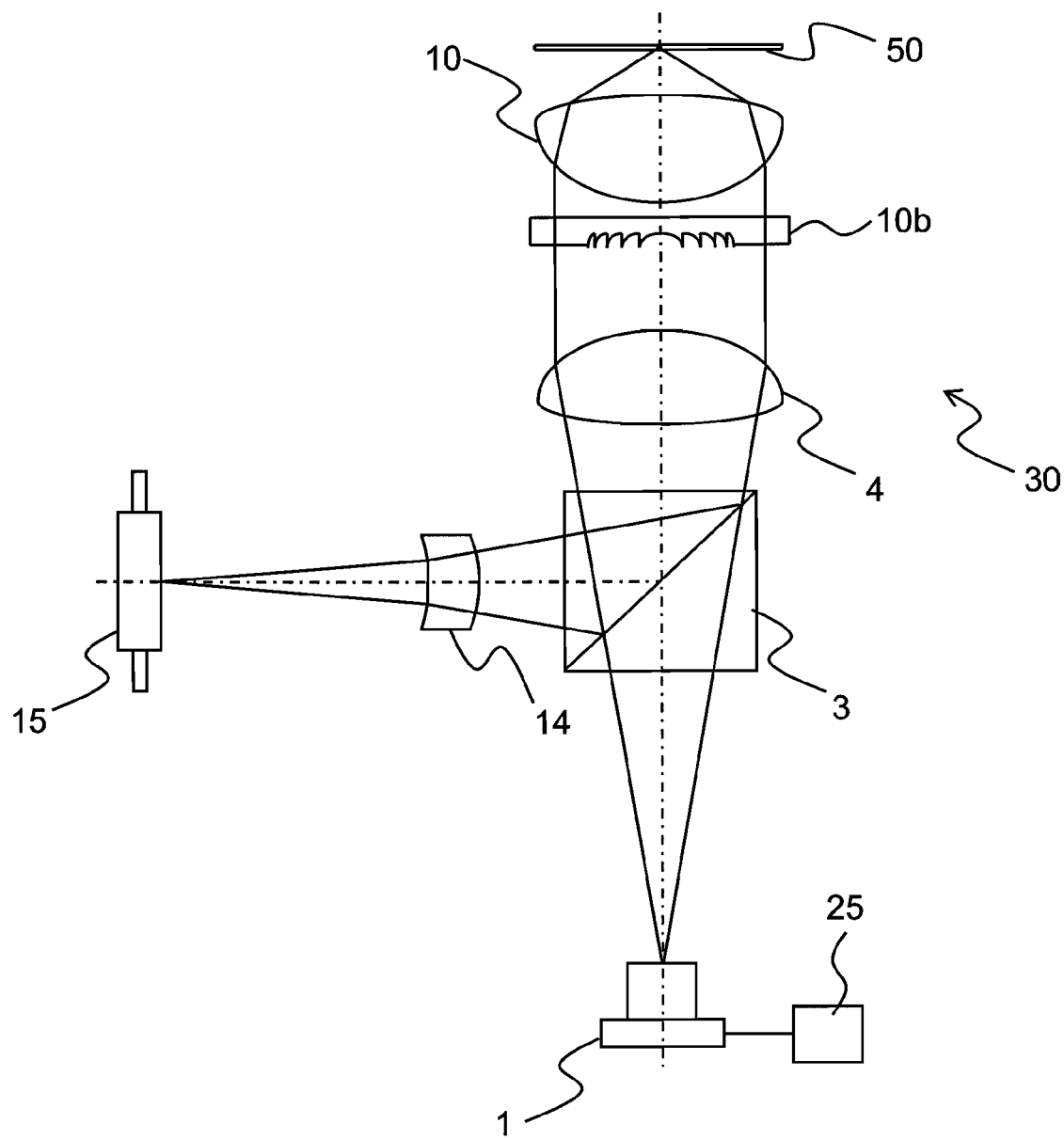
FIG. 6 is a schematic view of an optical pickup for recording or reproducing a first high-density disc according to a third embodiment of the invention.
Figure 7:
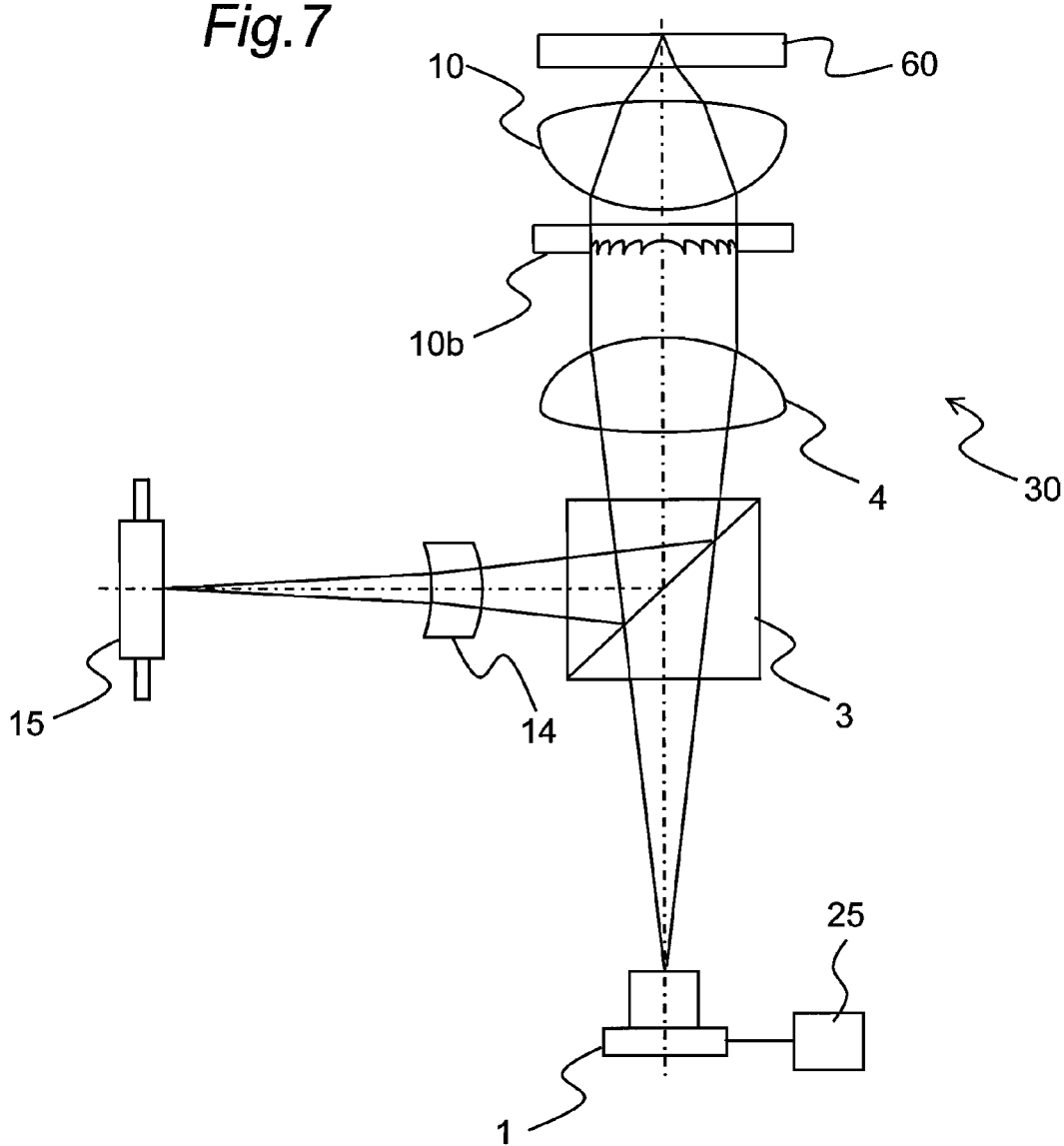
FIG. 7 is a schematic view of an optical pickup for recording or reproducing a second high-density disc according to the third embodiment of the invention.

FIG. 6 and FIG. 7 are schematic views of an optical pickup in another an embodiment of the invention. In FIG. 6 and FIG. 7, an optical pickup 30 includes a light source for emitting blue-violet laser beam 1, a beam splitter 3, a collimator lens 4, a diffractive lens 10b, an objective lens 10 (refractive lens), a detection lens 14, and a light detector for receiving laser beam 15. Reference numeral 50 is a first high-density disc, which is an optical disc of about 0.1 mm in protective substrate thickness (0.11 mm or less, represented by 0.1 mm), and 60 is a second high-density disc, which is an optical disc of about 0.6 mm in protective substrate thickness (0.5 mm to 0.7 mm, represented by 0.6 mm). Generally, the information recording density is higher in the first high-density disc 50 than the information recording density in the second high-density disc 60.

Referring first to FIG. 1, operation of optical pickup 30 for recording or reproducing information in the first high-density disc 50 is explained. A blue-violet laser beam emitted from the light source 1 passes through the beam splitter 3, and is converted into substantially parallel light by the collimator lens 4, and passes through the diffractive lens 10b, and is focused by the objective lens 10a as light spot on the information recording surface of the first high-density disc 50 over the protective substrate. The blue-violet laser beam of the backward path reflected by the information recording surface of the first high-density disc 50 passes through the objective lens 10a, diffractive lens 10b, and collimator lens 4 via the same optical path as the forward path, and is reflected by the beam splitter 3, and is provided with a specified astigmatism by the detection lens 14, and is guided into the light detector 15, and the information signal and servo signal are generated by the light detector 15. For the sake of convenience, the optical path from the light source 1 until reaching the recording surface of optical disc 50 or 60 is called the forward path optical system, and the optical path of the light reflected by the optical disc 50 or 60 until reaching the light detector 15 is called the backward path optical system.

Referring next to FIG. 2, operation of optical pickup 30 for recording or reproducing information in the second high-density disc 60 is explained. A blue-violet laser beam emitted from the light source 1 passes through the beam splitter 3, and is converted into substantially parallel light by the collimator lens 4, and is diffracted by the diffractive lens 10b, and is focused by the objective lens 10a as light spot on the information recording surface of the second high-density disc 60 over the protective substrate. The blue-violet laser beam of the backward path reflected by the information recording surface of the second high-density disc 60 passes through the objective lens 10a, hologram 5, and collimator lens 4 via the same optical path as the forward path, and is reflected by the beam splitter 3, and is provided with a specified astigmatism by the detection lens, and is guided into the light detector 15, and the information signal and servo signal are generated.

As for the focus error signal for recording or reproducing the first high-density disc 50 and second high-density disc 60, a method of astigmatism may be applied, that is, the focusing spot provided with astigmatism by the detection lens 14 is detected by four-division pattern in the light detector 15. As for the tracking error signal, a so-called three-beam method or differential push-pull (DPP) method may be applied with main beam and sub-beam produced by diffraction grating (not shown).

Figure 8:
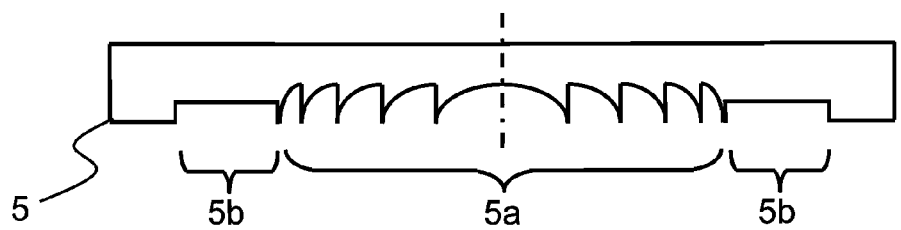
FIG. 8 is a schematic view of diffractive lens in the third embodiment.
Figure 9B:
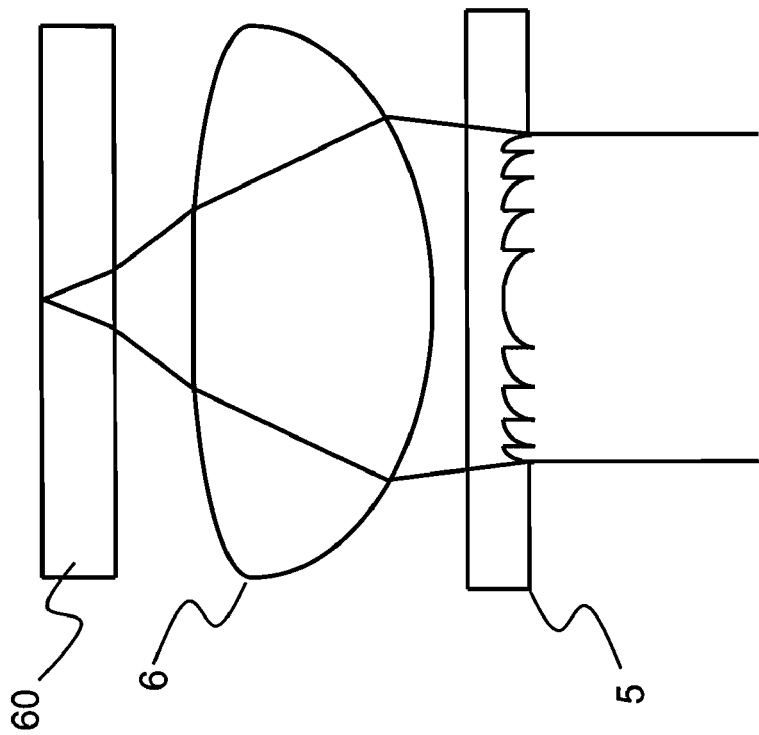
FIG. 9B is a schematic view of operation of diffractive lens and objective lens in the third embodiment, showing operation corresponding to second high-density disc.
Figure 9A:
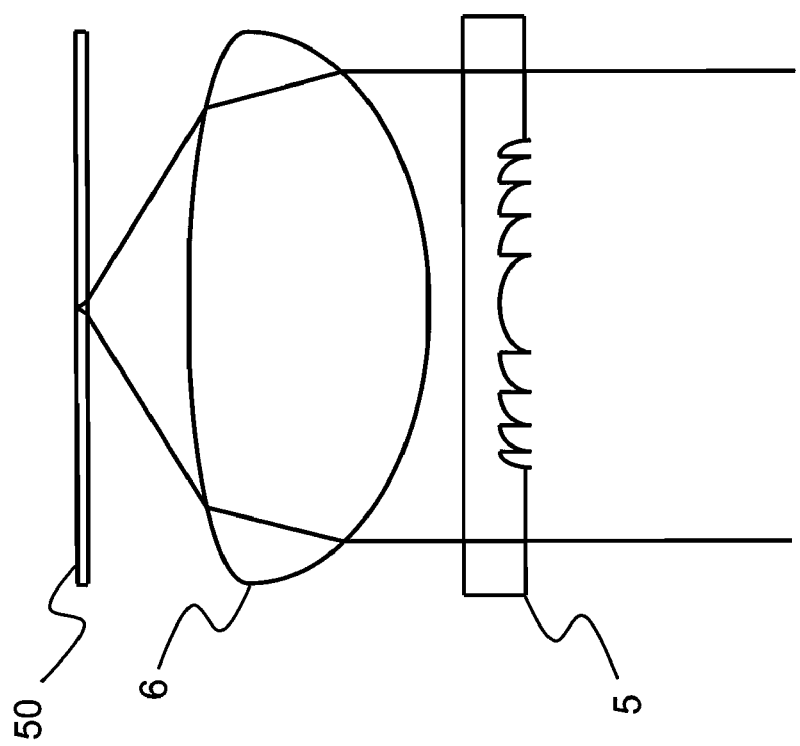
FIG. 9A is a schematic view of operation of diffractive lens and objective lens in the third embodiment, showing operation corresponding to first high-density disc.

Function of diffractive lens 10*b* and objective lens 10*a* is explained specifically by referring to FIG. 8A, FIG. 9A, and FIG. 9B. The diffractive lens 10*b* has a concentric grating pattern 10*c*, and its center or optical axis coincides with the objective lens 10*a* within an assembling error. The grating pattern of the diffractive lens 10*b* is formed in a smaller diameter than the opening determined by the objective lens 10*a*. Therefore, diffraction does not occur at all in the portion of the diffractive lens 10*b* not forming the grating pattern.

The phase of 0-order diffraction light (transmission light) of the grating pattern 5*a* is the average value of phase modulation amount given by the grating pattern 5*a*. It is preferred to enhance the focusing performance by adjusting the phase of transmission light of the region 10*d* without grating pattern to a similar value. For example, in the case of relief type of grating pattern of the diffractive lens 10*b*, as shown in FIG. 3, it is desired to adjust the height of the surface of the region 10*d* without grating pattern to an approximately average level of undulations of the portion forming the grating pattern 10*c*.

The diffractive lens 10*b* is less than 100% in diffraction efficiency of its +primary diffraction light, and is designed to have a sufficient intensity also in the transmission light (0-order diffraction light). By blazing the diffractive lens 10*b*, the sum of quantity of light of 0-order diffraction light and +primary diffraction light can be increased, and the use efficiency of light is enhanced.

The objective lens 10*a* is 0.85 in numerical aperture NA, and as shown in FIG. 4 (A), when the laser beam passing without diffraction by the diffractive lens 10*b* (that is, 0-order diffraction light) enters, the objective lens 10*a* is designed so that the focusing spot of diffraction limit may be formed on the first high-density disc 50 of about 0.1 mm in protective substrate thickness. On the other hand, as shown in FIG. 9B, the +primary diffraction light diffracted by the diffractive lens 10*b* is focused by the objective lens 10*a* on the second high-density disc 60. The +primary diffraction light is corrected in aberration to as to form the focusing spot of diffraction limit on the second high-density disc 60 of 0.6 mm in protective substrate thickness. With such combination of diffractive lens 10*b* diffracting part of incident light and objective lens 10*a*, light spots focused to diffraction limit may be formed on optical discs of different substrate thickness, so that a two-focus lens may be realized.

Herein, when the diffractive lens 10*b* is used as optical pickup capable of reproducing the second high-density disc 60 only, and recording and reproducing the first high-density disc 50, preferably, the light output emitted from the light source 1 should be greater when reproducing the second high-density disc 60 than when reproducing the first high-density disc 50. Adjustment of light output emitted from the first light source 1 is controlled by the light quantity adjusting unit 25. In such configuration, the 0-order diffraction efficiency may be set higher than the +primary diffraction efficiency of the diffractive lens 10*b*. Thus, when the diffraction efficiency is higher in the diffraction light of lower order, the required grating depth of the diffraction grating of the diffractive lens 10*b* may be shallower, and when forming the diffractive lens 10*b* by using a die, for example, the transferring and parting property of the die is excellent. In the case of configuration of optical pickup of the invention, since the light output of the light source 1 can be transmitted to the first high-density disc 50 at high efficiency, the quantity of light of the light spot focused on the first high-density disc 50 by the 0-order diffraction light can be sufficiently enhanced without enhancing the light output of the light source 1. The quantity of light of the light spot focused on the first high-density disc 50 is required to be about 10 times to 20 times higher than when reproducing in order to record in the first high-density disc 50. However, initially, since the light output of the light source 1 is set lower when reproducing the first high-density disc 50 than when reproducing the second high-density disc 60, if the quantity of light is required by tens of times when recording in the first high-density disc 50 than when reproducing, the light output of the light source 1 may be assured sufficiently. Herein, when the light output of the light source 1 is higher when reproducing the first high-density disc 50 than when reproducing the second high-density disc 60, a much higher light output is required in the light source 1 when recording in the first high-density disc 50, and a large burden is applied to the light source 1. That is, according to the configuration of the optical pickup of the invention, the light output of the semiconductor laser used as light source 1 can be utilized efficiently, and the service life of semiconductor may be extended, and the power consumption of the optical pickup may be lowered.

The light received in the light receiver of the light detector 15 is generally converted into an electric signal, and the converted electric signal is outputted from a terminal. In the configuration of the optical pickup of the invention, as compared with the case of reproduction of ROM disc in which data is recorded preliminarily or write-once R disc, such as first high-density disc 50 or second high-density disc 60, when reproducing the two-layer disc of programmable RE disc as first high-density disc 50, the quantity of light of luminous flux in the backward path reaching the light receiver of the light detector 15 is small. As compared with the case of reproduction of ROM disc or R disc, such as first high-density disc 50 or second high-density disc 60, when recording in the first high-density disc 50, the quantity of light of luminous flux in the backward path reaching the light receiver on the light detector 15 is large.

The light detector 15 is desirably provided with, as shown in FIG. 5, a switch 93 for sending the electric signal received and converted in the light receiver 91 to an output terminal 92, and a changeover type amplifier circuit group. With such configuration, when reproducing the two-layer disc of RE disc small in the quantity of light reaching up to the light receiver, the amplification rate (gain) is changed over to a higher circuit 94, and when recording in the first high-density disc large in the quantity of light reaching up to the light receiver, the amplification rate (gain) is changed over to a lower circuit 96, or when reproducing the R disc or ROM disc or when reproducing the high-density disc, the amplification rate (gain) is changed over to an intermediate circuit 95. Therefore, regardless of the type of discs to be recorded or reproduced, the magnitude of electric signal outputted from the signal output terminal 92 of the light detector 15 is kept within a specified range. With such configuration, in the circuit for receiving the electric signal outputted from the light detector 15, and producing control signal or reproduced signal, the input allowable signal level of signal input unit can be narrowed, and a more stable signal can be generated, and the circuit scale can be reduced.

On the other hand, both in the first high-density disc 50 and in the second high-density disc 60, when the diffractive lens 10b is used as optical pickup exclusive for reproduction, preferably, the light output emitted from the light source 1 should be greater when reproducing the second high-density disc 60 than when reproducing the first high-density disc 50. With such configuration, the 0-order diffraction efficiency may be set higher than the +primary diffraction efficiency of the diffractive lens 10b. With this configuration, too, when the diffraction efficiency is higher in the diffraction light of lower order, the required grating depth of the diffraction grating of the diffractive lens 10b may be shallower, making it is easier to fabricate the diffractive lens 10b. With this configuration, for example, when a programmable RE disc of low reflectivity is used as the first high-density disc 50, the luminous flux emitted at low quantity of light from the light source 1 passes through the diffractive lens 10b of high 0-order diffraction efficiency, and a sufficient quantity of light for reproducing the signal on the recording surface of first high-density disc 50 is available, and the reflected light reflected at low reflectivity on the recording surface passes through the diffractive lens 10b at high efficiency (0-order diffraction efficiency) in its backward path optical system, and the quantity of light capable of converting the reflected light into a signal of high quality by the light detector 15 may be received. When the ROM disc or R disc is used as first high-density disc 50, since the reflectivity on the recording surface is higher than the RE disc, the light detector 15 receives a sufficient quantity of light capable of converting into signal of high quality. The RE disc is a disc capable of erasing once recorded data by laser irradiation of high power, but when reproducing the RE disc in which data is recorded, the data may be deteriorated if the quantity of spot light on the recording surface is set higher than the specified quantity. In the case of configuration of the invention, too, since the diffractive lens 10b can transmit at high efficiency even in the backward path optical system, a sufficient quantity of light for obtaining a reproduced signal of sufficiently high quality may be received in the light detector 15 without enhancing the quantity of light spot on the recording surface. On the other hand, as the second high-density disc 60, when corresponding to a disc having a recording layer of a somewhat high reflectivity, such as ROM disc or R disc, the luminous flux emitted in a high quantity of light from the light source 1 has a high quantity of light in the recording layer of the second high-density disc 60 if passing through the diffractive lens 10b of low primary diffraction efficiency, and the reflected light in the recording layer of the disc also has a high quantity of light, and if passing through the diffractive lens 10b at low efficiency (primary diffraction efficiency) in its backward path optical system, the luminous flux with a sufficient quantity of light for obtaining a signal of high quality can reach the light detector 15. That is, according to the configuration of the optical pickup of the invention, as an optical disc for reproducing, whichever disc may be used as first high-density disc 50, such as ROM disc, R disc or RE disc, reproduction of high quality low in error rate is realized. When the RE disc is used as first high-density disc 50, it is effective to suppress deterioration of data generated when a quantity of light for reproduction is emitted more than necessary to the recording surface. When corresponding only to the ROM disc as second high-density disc, in particular, if the quantity of light on the recording surface is increased more than the specified quantity, data deterioration hardly occurs structurally. Therefore, the light output of the light source 1 may be enhanced to a level sufficiently allowing lowness of efficiency of passing the diffractive lens 10b in the backward path optical system in order to obtain a signal of higher quality.

In embodiment 1, meanwhile, the material for configuring the objective lens 10b is preferably glass. In such configuration, even by irradiation with blue-violet laser, an optical pickup of high reliability may be realized, being free from deterioration of material by blue-violet light to cause disturbance in material transmissivity or wavefront aberration. With the same reason, the material for configuring the diffractive lens 10b is desired to be glass, but since the luminous flux passing through the diffractive lens 10b is not in focused state, the luminous flux density is lower as compared with that of the side facing the optical disc 50 or 60 of the objective lens 10a, and effect of deterioration by blue-violet ray is smaller, and hence a resin material may be also used. When using resin material, as compared with glass material, the diffractive lens 10b can be reduced in weight. For example, when the diffractive lens 10b is mounted on the movable element of same objective lens actuator as the objective lens 10a, the weight of the movable element can be reduced, and it is advantageous when accessing the optical disc at higher speed.

Generally, in an optical disc recording and reproducing apparatus, semiconductor laser generates noise due to return light from the optical disc. By lowering the coherence by spreading the spectrum of semiconductor laser, it is known that the noise can be reduced. In one of such methods, as explained in FIG. 4A, FIG. 4B, and FIG. 4C in the first embodiment, high output laser is used for spreading the spectrum by superimposing high frequency signal components on the driving current of the semiconductor laser, which is known as recording type optical disc device, which may be applied also in this embodiment.

Figure 10:
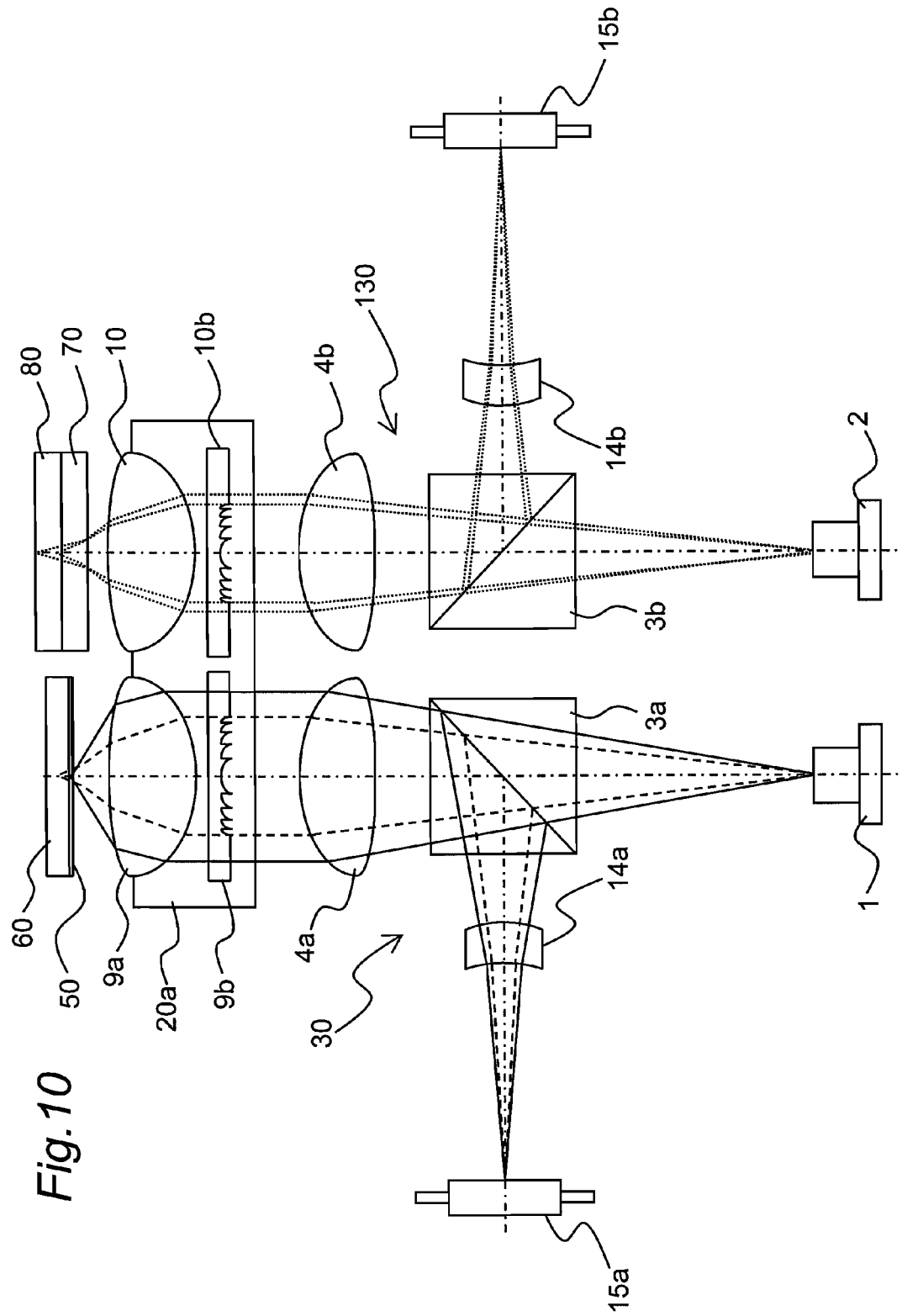
FIG. 10 is a schematic view of an optical pickup corresponding to all four kinds of discs in the third embodiment.

Further, as shown in FIG. 10, an optical system consisting of an optical pickup 30 corresponding to both first high-density disc 50 and second high-density disc 60, and an optical pickup 130 corresponding to both first low-density disc (DVD) 70 and second low-density disc (CD) 80 is mounted simultaneously, and an optical pickup 200 applicable to all four types of discs may be configured. In this case, two focusing lens groups, that is, diffractive lens 10b, objective lens 10a, diffractive lens 9b, and objective lens 9a may be mounted on a movable element 20a of same actuator. With such configuration, since the interval of two objective lenses can be narrowed, and the entire structure of the optical pickup 200 may be reduced. With this configuration, the optical system of the optical pickup 130 corresponding to both first low-density disc (DVD) 70 and second low-density disc (CD) 80 is not limited to the structure shown in FIG. 10, and the optical system of the optical pickup 130 corresponding to both first low-density disc (DVD) 70 and second low-density disc (CD) 80 is not particularly specified, and even in such case, as mentioned above, the light output emitted from the light source 1 is set larger when reproducing the second high-density disc 60 than when reproducing the first high-density disc 50, and the obtained effects are evident and similar to this embodiment.

Fourth Embodiment

Figure 11:
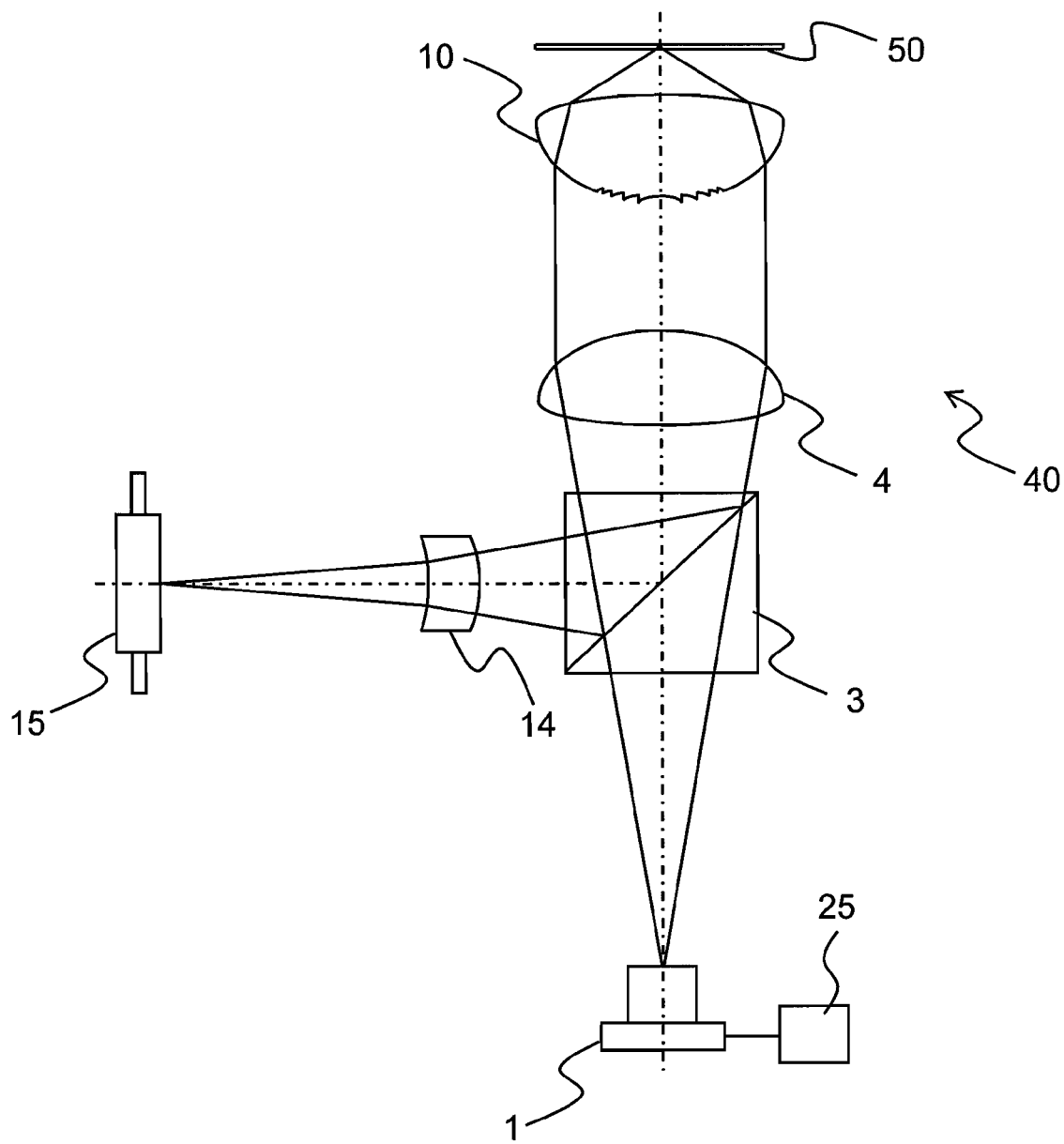
FIG. 11 is a schematic view of an optical pickup for recording or reproducing a first high-density disc in a fourth embodiment.
Figure 12:
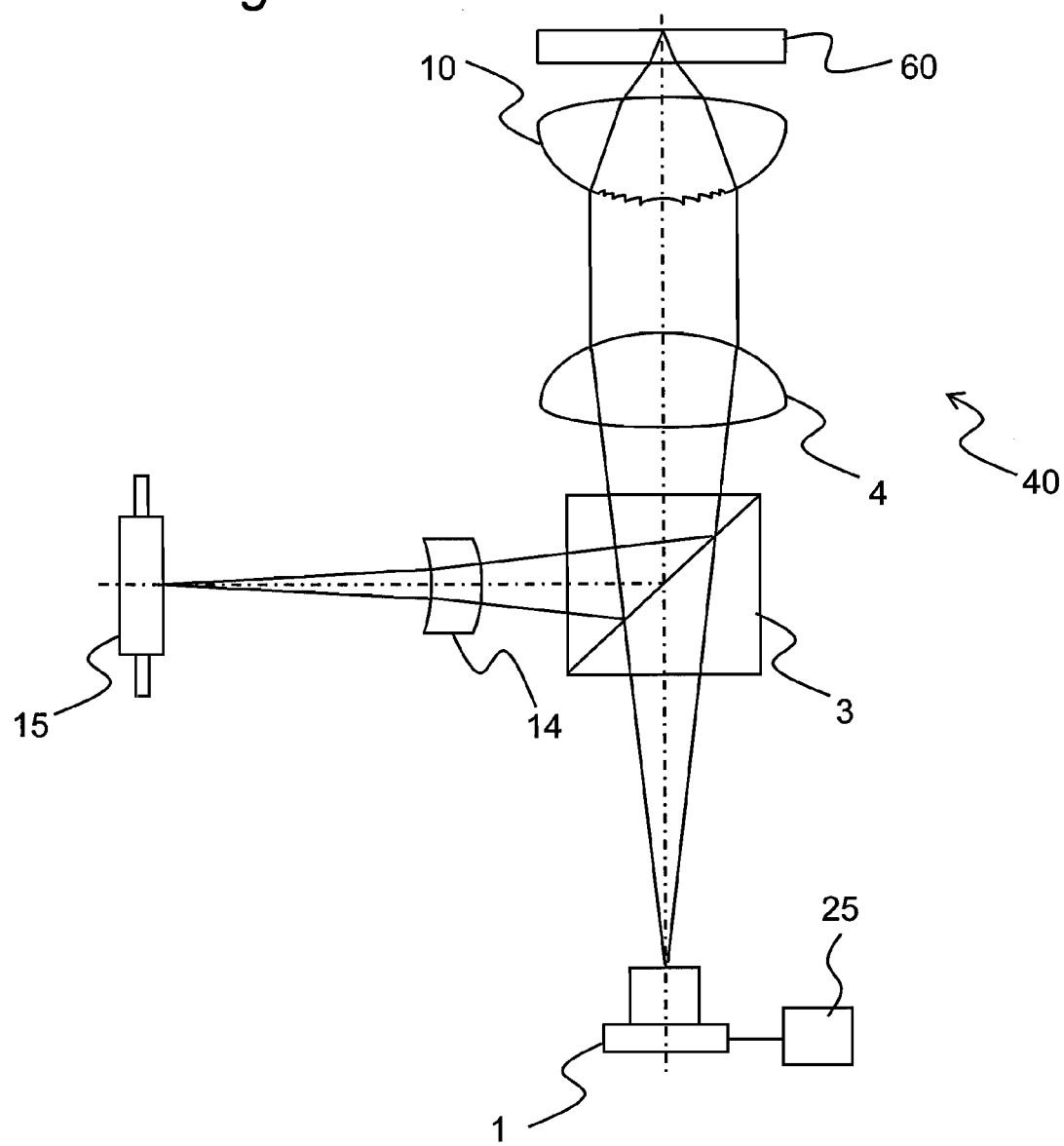
FIG. 12 is a schematic view of an optical pickup for recording or reproducing a second high-density disc in the fourth embodiment.

FIG. 11 and FIG. 12 are schematic views of an optical pickup according to a fourth embodiment of the invention. In FIG. 11 and FIG. 12, same parts as in the third embodiment are identified with same reference numerals and the description is omitted. In FIG. 11 and FIG. 12, an optical pickup 400 includes a light source for emitting blue-violet laser beam 1, a beam splitter 3, a collimator lens 4, a diffraction grating integrated objective lens 10, a detection lens 14, and a light detector for receiving laser beam 15. Reference numeral 50 is a first high-density disc, which is an optical disc of about 0.1 mm in protective substrate thickness, and 60 is a second high-density disc, which is an optical disc of about 0.6 mm in protective substrate thickness.

Referring first to FIG. 11, operation of optical pickup 40 for recording or reproducing information in the first high-density disc 50 is explained. A blue-violet laser beam emitted from the light source 1 passes through the beam splitter 3, and is converted into substantially parallel light by the collimator lens 4, and passes through the diffraction grating integrated objective lens 10 to be focused as light spot on the information recording surface of the first high-density disc 50 over the protective substrate. The blue-violet laser beam of the backward path reflected by the information recording surface of the first high-density disc 50 passes through the diffraction grating integrated objective lens 10, and collimator lens 4 via the same optical path as the forward path, and is reflected by the beam splitter 3, and is provided with a specified astigmatism by the detection lens 14, and is guided into the light detector 15, and the information signal and servo signal are generated by the light detector 15.

Referring next to FIG. 12, operation of optical pickup 40 for recording or reproducing information in the second high-density disc 60 is explained. A blue-violet laser beam emitted from the light source 1 passes through the beam splitter 3, and is converted into substantially parallel light by the collimator lens 4, and is diffracted and focused by the diffraction grating integrated objective lens 10 to be focused as light spot on the information recording surface of the second high-density disc 60 over the protective substrate. The blue-violet laser beam of the backward path reflected by the information recording surface of the second high-density disc 60 passes through the diffraction grating integrated objective lens 10, and collimator lens 4 via the same optical path as the forward path, and is reflected by the beam splitter 3, and is provided with a specified astigmatism by the detection lens 14, and is guided into the light detector 15, and the information signal and servo signal are generated in the light detector 15.

Function of diffraction grating integrated objective lens 10 is same as in the first embodiment explained in FIG. 2A and FIG. 2B. However, in the first embodiment, the diffraction grating integrated objective lens 10 is a diffraction grating provided for corresponding to each one of second high-density disc 60, first low-density disc 70, and second low-density disc 80, but in the fourth embodiment, it is a diffraction grating provided for corresponding to the first high-density disc 50 and second high-density disc 60.

The diffraction grating integrated objective lens 10 is less than 100% in diffraction efficiency of its +primary diffraction light, and is designed to have a sufficient intensity also in the transmission light (0-order diffraction light). By blazing the diffraction grating integrated objective lens 10, the sum of quantity of light of 0-order diffraction light and +primary diffraction light can be increased, and the use efficiency of light is enhanced. The diffraction grating integrated objective lens 10 is 0.85 in numerical aperture NA, and as shown in FIG. 2A, when the laser beam passing without diffraction by the diffraction grating integrated objective lens 10 (that is, 0-order diffraction light) enters, the diffraction grating integrated objective lens 10 is designed so that the focusing spot of diffraction limit may be formed on the first high-density disc 50 of about 0.1 mm in protective substrate thickness. On the other hand, as shown in FIG. 2B, the +primary diffraction light diffracted by the diffraction grating integrated objective lens 10 is focused on the second high-density disc 60. The +primary diffraction light is corrected in aberration so as to form the focusing spot of diffraction limit on the second high-density disc 60 of 0.6 mm in protective substrate thickness. Herein, the +primary diffraction light is corrected in aberration so as to form the focusing spot of diffraction limit on the second high-density disc 60 of 0.6 mm in protective substrate thickness.

With the diffraction grating integrated objective lens 10 for diffracting part of the incident light, light spots focused to diffraction limit may be formed on optical discs of different substrate thickness, so that a two-focus lens may be realized.

Herein, when the diffraction grating integrated objective lens 10 is used as optical pickup capable of reproducing the second high-density disc 60 only, and recording and reproducing the first high-density disc 50, preferably, the light output emitted from the light source 1 should be greater when reproducing the second high-density disc 60 than when reproducing the first high-density disc 50. Adjustment of light output emitted from the first light source 1 is controlled by the light quantity adjusting unit 25. With such configuration, the 0-order diffraction efficiency may be set higher than the +primary diffraction efficiency of the diffraction grating integrated objective lens 10. Thus, since the light output of the light source 1 can be transmitted to the first high-density disc 50 at high efficiency, the quantity of light of the light spot focused on the first high-density disc 50 by the 0-order diffraction light can be sufficiently enhanced without enhancing the light output of the light source 1 by force. The quantity of light of the light spot focused on the first high-density disc 50 is required to be about 10 times to 20 times higher than when reproducing in order to record in the first high-density disc 50. However, initially, in the optical pickup of the invention, since the light output of the light source 1 is set lower when reproducing the first high-density disc 50 than when reproducing the second high-density disc 60, if the quantity of light is required by tens of times when recording in the first high-density disc 50 than when reproducing, the light output of the light source 1 may be assured sufficiently. Herein, when the light output of the light source 1 is higher when reproducing the first high-density disc 50 than when reproducing the second high-density disc 60, a much higher light output is required in the light source 1 when recording in the first high-density disc 50, and a large burden is applied to the light source 1. That is, according to the configuration of the optical pickup of the invention, the light output of the semiconductor laser used as light source 1 can be utilized efficiently without loss, and the service life of semiconductor may be extended, and the power consumption of the optical pickup may be lowered. The light received in the light receiver of the light detector 15 is generally converted into an electric signal, and the converted electric signal is outputted from a terminal. In the configuration of the optical pickup of the invention, as compared with the case of reproduction of first high-density record 50 or second high-density disc 60 such as ROM disc or R disc of first high-density disc, when reproducing the two-layer disc of RE disc as first high-density disc 50, the quantity of light of luminous flux in the backward path reaching the light receiver of the light detector 15 is small. Further, as compared with the case of reproduction of ROM disc or R disc, such as first high-density disc 50 or second high-density disc 60, when recording in the first high-density disc 50, the quantity of light of luminous flux in the backward path reaching the light receiver of the light detector 15 is large. Accordingly, same as in the configuration of the first embodiment, the light detector 15 is desirably provided with, as shown in FIG. 5, a switch 93 for sending the electric signal received and converted in the light receiver 91 to an output terminal 92, and a changeover type amplifier circuit group. In such configuration, when reproducing the two-layer disc of RE disc small in the quantity of light reaching the light receiver, the amplification rate (gain) is changed over to a higher circuit 94, and when recording in the first high-density disc large in the quantity of light reaching the light receiver, the amplification rate (gain) is changed over to a lower circuit 96, or when reproducing the R disc or ROM disc or when reproducing the high-density disc, the amplification rate (gain) is changed over to an intermediate circuit 95. Therefore, regardless of the type of discs to be recorded or reproduced, the magnitude of electric signal outputted from the signal output terminal 92 of the light detector 15 is kept within a specified range. In such configuration, in the circuit for receiving the electric signal outputted from the light detector 15, and producing control signal or reproduced signal, the input allowable signal level of signal input unit can be narrowed, and a more stable signal can be generated, and the circuit scale can be reduced.

On the other hand, both in the first high-density disc 50 and in the second high-density disc 60, when the diffraction grating integrated objective lens 10 is used as optical pickup exclusive for reproduction, preferably, the light output emitted from the light source 1 should be greater when reproducing the second high-density disc 60 than when reproducing the first high-density disc 50. With such configuration, the 0-order diffraction efficiency may be set higher than the +primary diffraction efficiency of the diffraction grating integrated objective lens 10. With this configuration, for example, when a programmable RE disc of low reflectivity is used as the first high-density disc 50, the luminous flux emitted at low quantity of light from the light source 1 passes through the diffraction grating integrated objective lens 10 of high 0-order diffraction efficiency, and a sufficient quantity of light for reproducing the signal on the recording surface of first high-density disc 50 is available, and the reflected light reflected at low reflectivity on the recording surface passes through the diffraction grating integrated objective lens 10 at high efficiency (0-order diffraction efficiency) in its backward path optical system, and the quantity of light capable of having a signal of high quality in the light detector 15 may be received. When the ROM disc or R disc is used as first high-density disc 50, since the reflectivity on the recording surface is higher than the RE disc, the light detector 15 may receive a sufficient quantity of light capable of converting into signal of high quality. The RE disc is a disc capable of erasing once recorded data by laser irradiation of high power, but when reproducing the RE disc in which data is recorded, the data may be deteriorated if the quantity of spot light on the recording surface is set higher than the specified quantity. In the case of configuration of the invention, too, since the diffraction grating integrated objective lens 10 can transmit at high efficiency even in the backward path optical system a sufficient quantity of light for obtaining a reproduced signal of sufficiently high quality may be received in the light detector 15 without heightening the quantity of light spot on the recording surface by force. On the other hand, as the second high-density disc 60, when corresponding to a disc having a recording layer of a somewhat high reflectivity, such as ROM disc or R disc, the luminous flux emitted in a high quantity of light from the light source 1 has a high quantity of light in the recording layer of the second high-density disc 60 if passing through the diffraction grating integrated objective lens 16 of low primary diffraction efficiency, and the reflected light in the recording layer of the disc also has a high quantity of light, and if passing through the diffraction grating integrated objective lens 16 at low efficiency (primary diffraction efficiency) in its backward path optical system, the luminous flux with a sufficient quantity of light for obtaining a signal of high quality can reach the light detector 15. In particular, when corresponding only to the ROM disc as second high-density disc, if the quantity of light on the recording surface is increased more than the specified quantity, data deterioration hardly occurs structurally, and the light output of the light source 1 may be enhanced to a level sufficiently allowing efficiency of passing the diffraction grating integrated lens 10 in the backward path optical system in order to obtain a signal of higher quality.

In the fourth embodiment, when reproducing the second high-density disc 60, since the light output of the light source 1 is a higher output as compared with the case of reproduction of first high-density disc 50, same as shown in the third embodiment, by stopping operation of the circuit for superimposing the high frequency signal components on the exit light from the light source 1 when reproducing the second high-density disc 60, the noise of semiconductor laser can be reduced, together with other effects.

Figure 13:
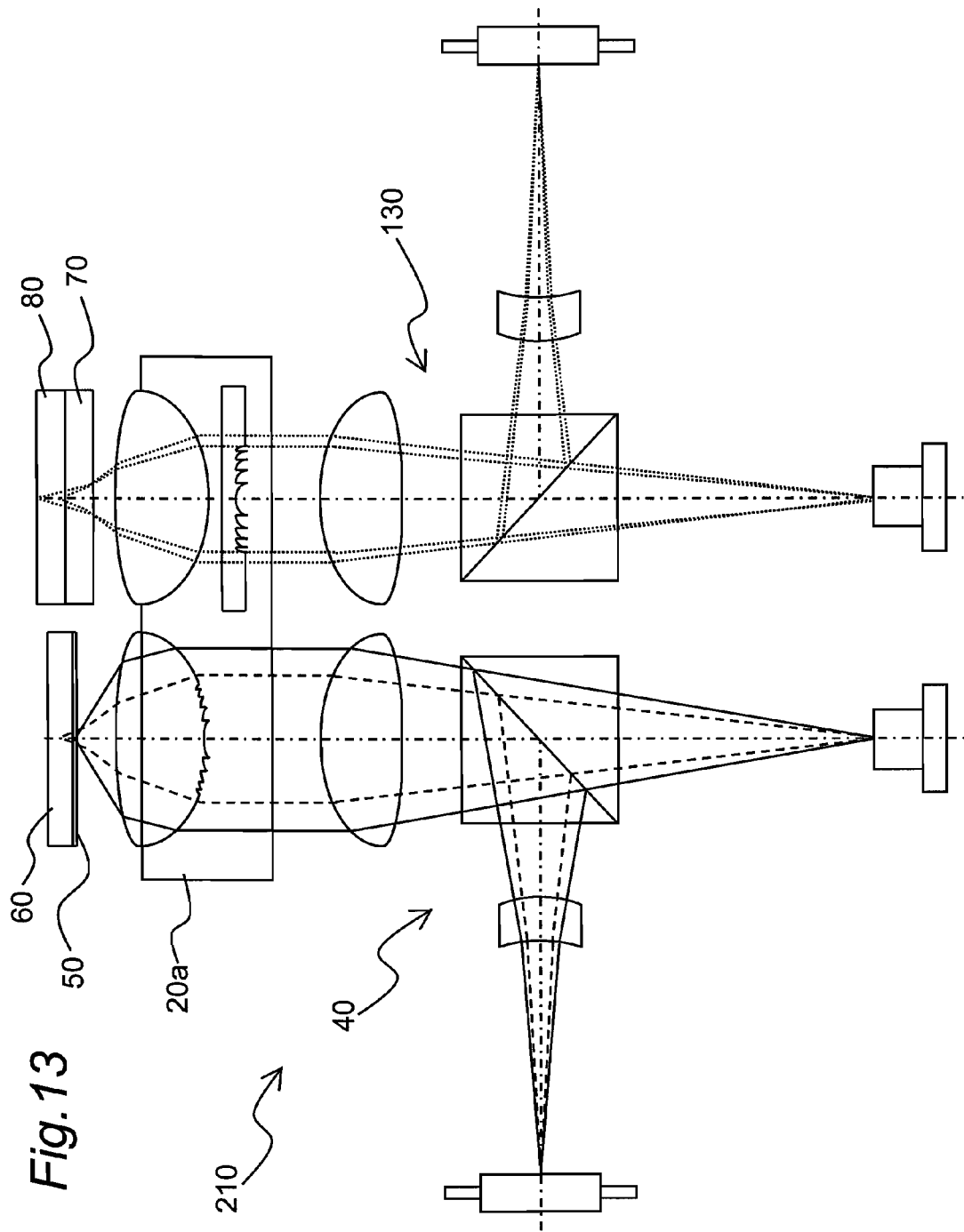
FIG. 13 is a schematic view of an optical pickup corresponding to all four kinds of discs in the fourth embodiment.

Further, as shown in FIG. 13, an optical system consisting of an optical pickup 40 corresponding to both first high-density disc 50 and second high-density disc 60, and an optical pickup 130 corresponding to both first low-density disc (DVD) 70 and second low-density disc (CD) 80 is mounted simultaneously, and an optical pickup 210 applicable to all four types of discs may be configured. In this case, the diffraction grating integrated objective lens 16, diffractive lens 105, and objective lens 106 may be mounted on a movable element 20b of same actuator. In such configuration, since the interval of two objective lenses can be narrowed, and the entire structure of the optical pickup 210 may be reduced. In this configuration, the optical system of the optical pickup 130 corresponding to both first low-density disc (DVD) 70 and second low-density disc (CD) 80 is not limited to the structure shown in FIG. 13, and any optical system of the optical pickup 130 capable of corresponding to both first low-density disc (DVD) 70 and second low-density disc (CD) 80 may be used, and even in such case, as mentioned above, the light output emitted from the light source 1 is set larger when reproducing the second high-density disc 60 than when reproducing the first high-density disc 50, and the obtained effects are evident and similar.

Fifth Embodiment

Figure 14:
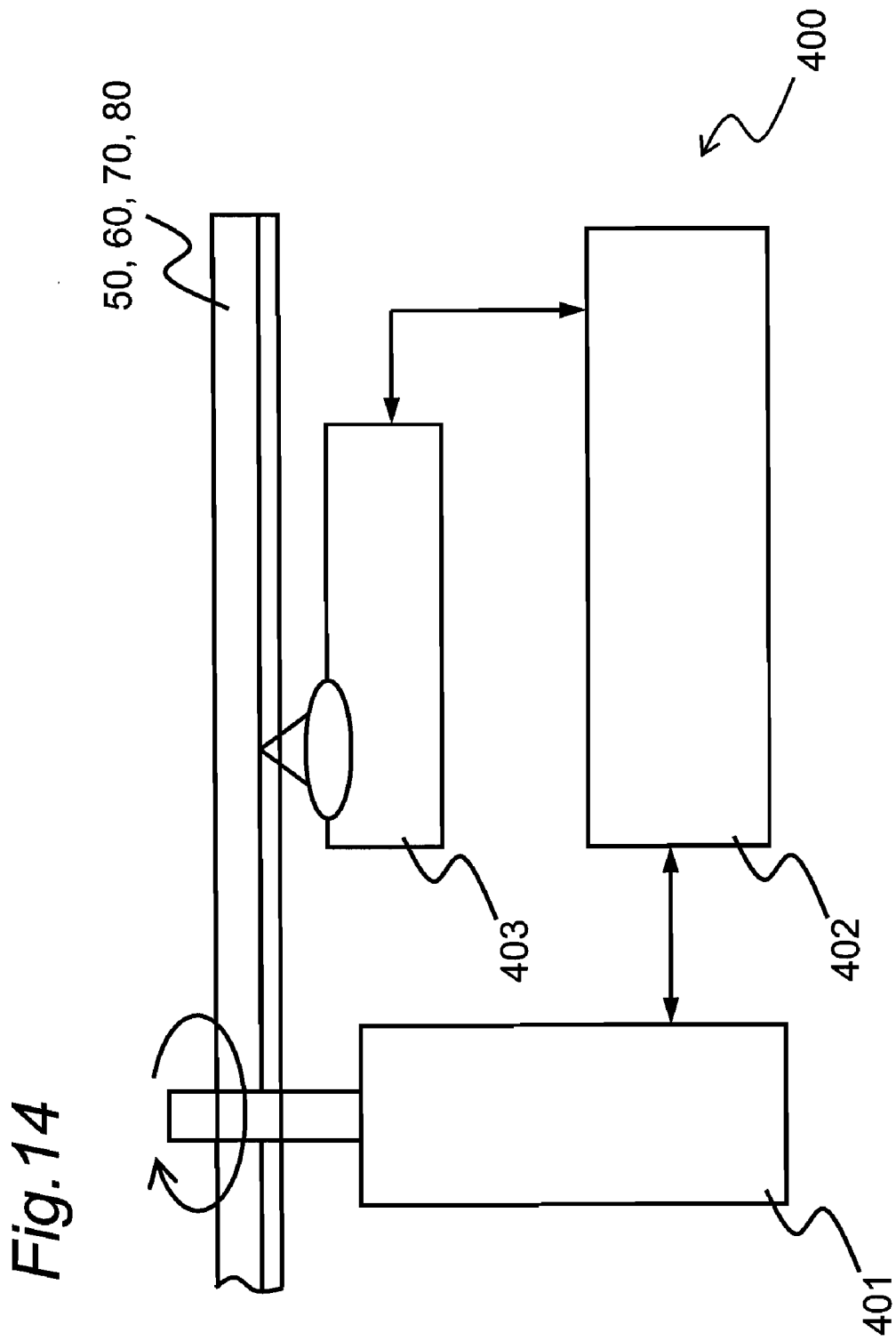
FIG. 14 is a schematic view of an optical disc device according to a fifth embodiment of the invention.

FIG. 14 is a schematic view of an optical disc device according to a fifth embodiment of the invention.

In FIG. 14, an optical disc device 400 includes an optical disc drive unit 401, a control unit 402, and an optical pickup 403. Discs 50, 60, 70, and 80 may be properly exchanged with first high-density disc or second high-density disc, first low-density disc 70, or second low-density disc 80.

The optical disc drive unit 401 has a function of rotating and driving the first high-density disc 50 (or second high-density disc 60, first low-density disc 70, second low-density disc 80), and the optical pickup 403 is either optical pickup mentioned in the first embodiment or second embodiment. The control unit 402 has a function of driving and controlling the optical disc drive unit 401 and optical pickup 403, a function of processing control signal and information signal received in the optical pickup 403, and a function of interfacing the information signal between inside and outside of the optical disc device 400.

The optical disc device 400 includes an optical pickup mentioned in any one of first embodiment to fourth embodiment, and the optical disc device 400 in this embodiment is capable of recording and reproducing favorably the plural light sources and the corresponding optical discs.

Sixth Embodiment

Figure 15:
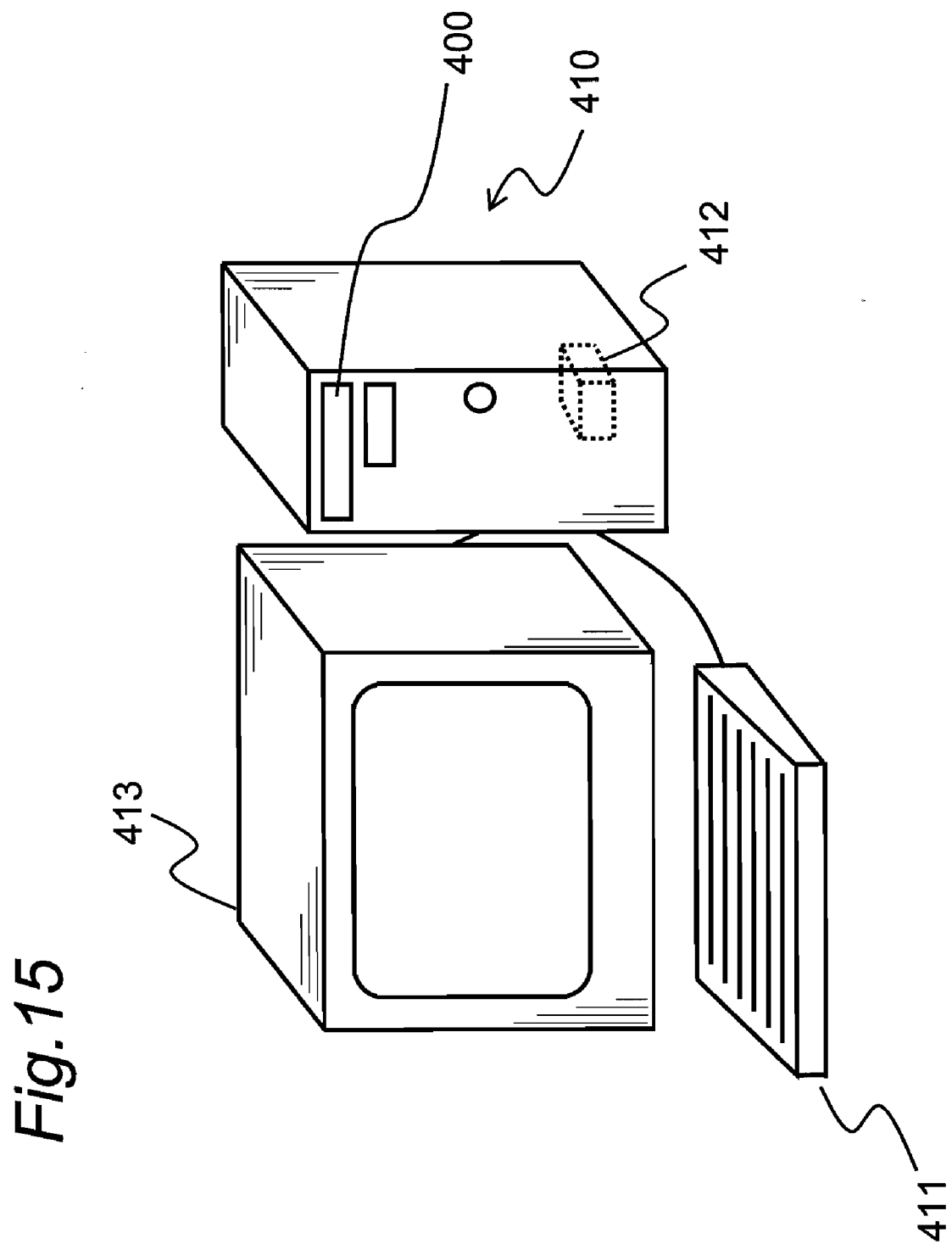
FIG. 15 is a schematic view of a computer according to a sixth embodiment of the invention.

FIG. 15 is a schematic view of computer according to a sixth embodiment of the invention.

In FIG. 15, a computer 410 includes an optical disc device 400 of the fifth embodiment, an input device 411 for entering information such as keyboard, mouse or touch panel, a processing unit 412 such as central processing unit (CPU) for processing according to the information read out from the optical disc device 400, and an output device 413 for displaying the information of the result processed by the processing unit 412 such as cathode-ray tube, liquid crystal display device, or printer.

The computer 410 has the optical disc device 400 of the fifth embodiment, and is capable of recording or reproducing optical discs of various kinds favorably, and is hence applicable in a wide range.

Seventh Embodiment

Figure 16:
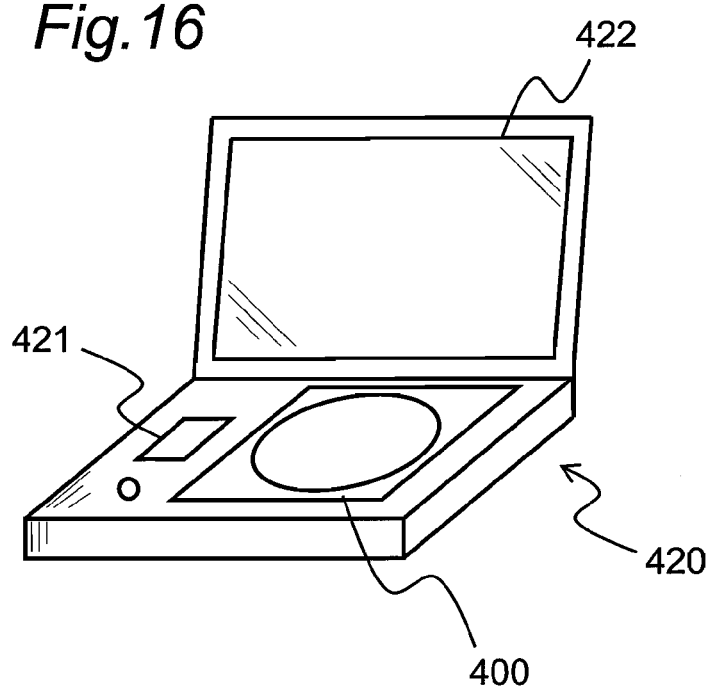
FIG. 16 is a schematic view of an optical disc player according to a seventh embodiment of the invention.

FIG. 16 is a schematic view of an optical disc player according to a seventh embodiment of the invention.

In FIG. 16, an optical disc player 420 includes an optical disc device 400 of the fifth embodiment, and a device for converting the information signal obtained from the optical disc device 400 into an image signal (for example, decoder 421).

This optical disc player 420 may be used as a car navigation system by adding a position sensor such as GPS and a central processing unit (CPU). In addition, the optical disc player 420 may include a display device 422 such as a liquid display monitor.

Since the optical disc player 420 includes the optical disc device 400 of the fifth embodiment, optical discs of different kinds can be recorded or reproduced, and thus it is applicable in a wide range.

Eighth Embodiment

Figure 17:
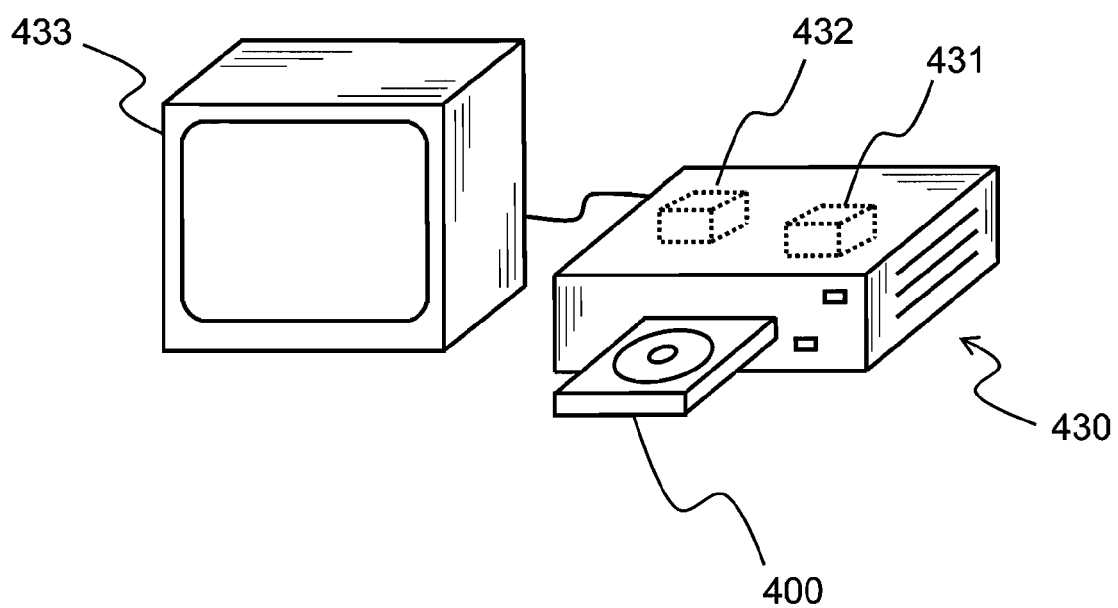
FIG. 17 is a schematic view of an optical disc recorder according to an eighth embodiment of the invention.
Figure 18:
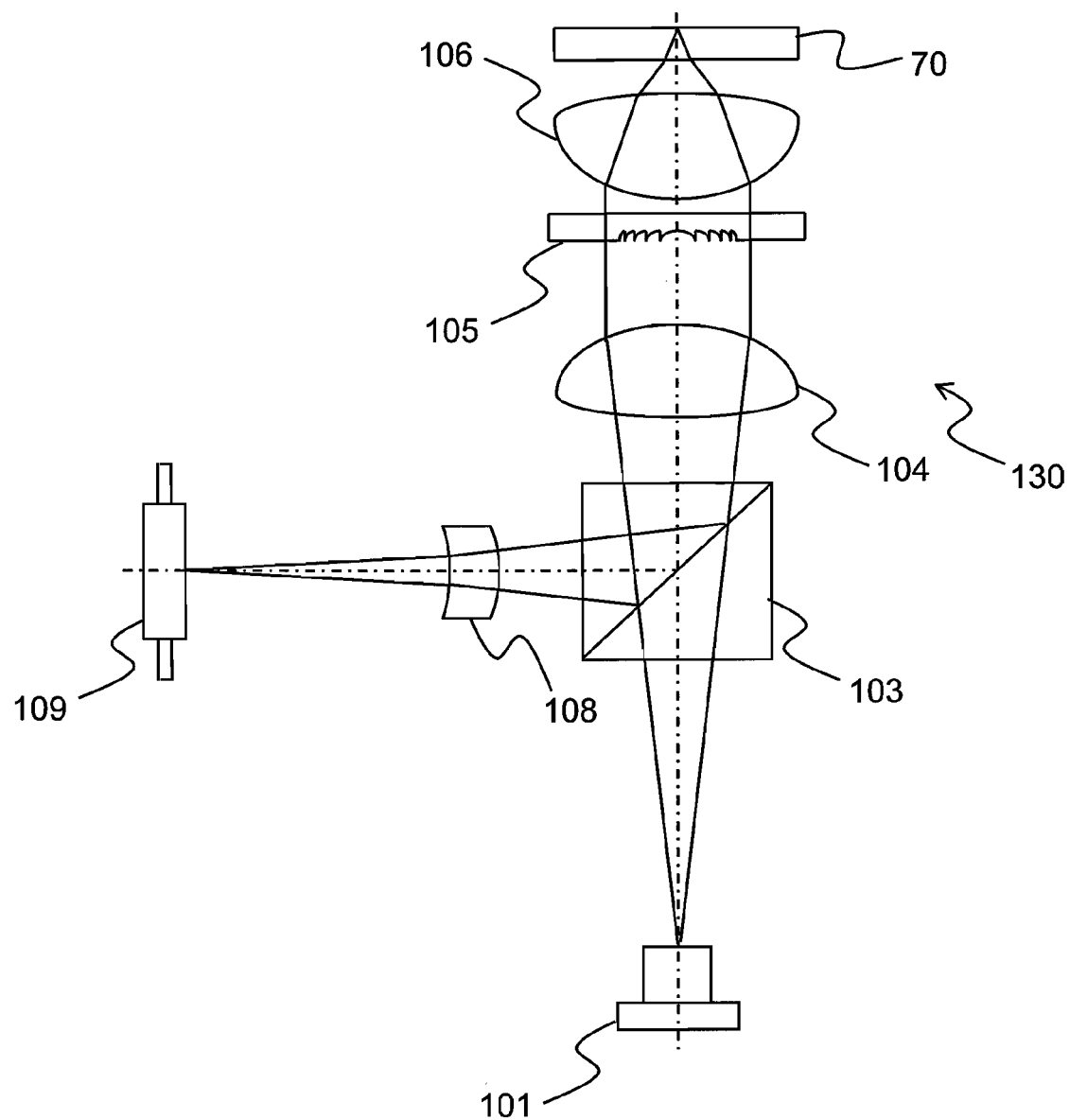
FIG. 18 is a schematic view of recording or reproducing a DVD with a conventional compatible optical pickup.
Figure 19:
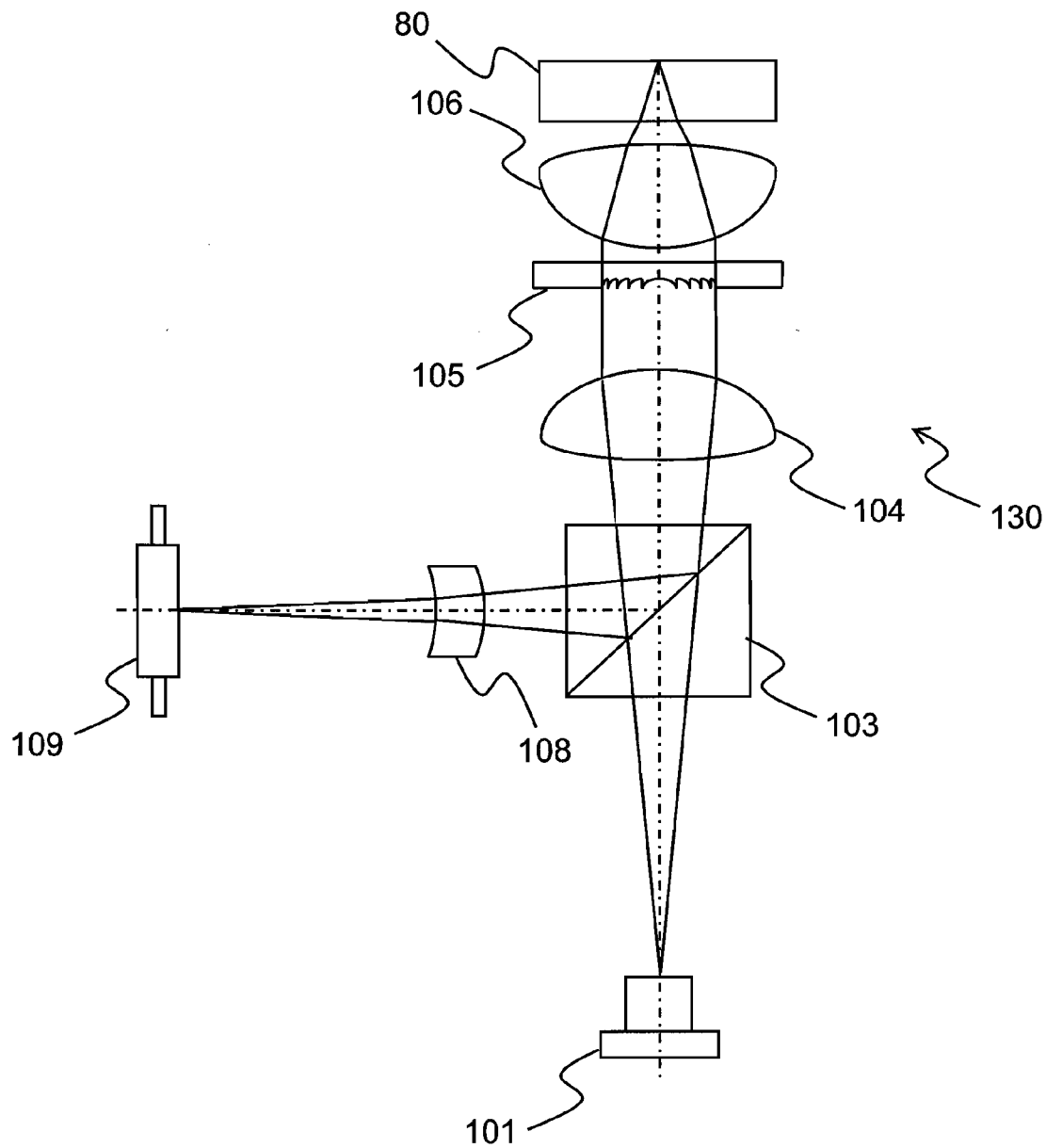
FIG. 19 is a schematic view of recording or reproducing a CD with a conventional compatible optical pickup.
Figure 20:
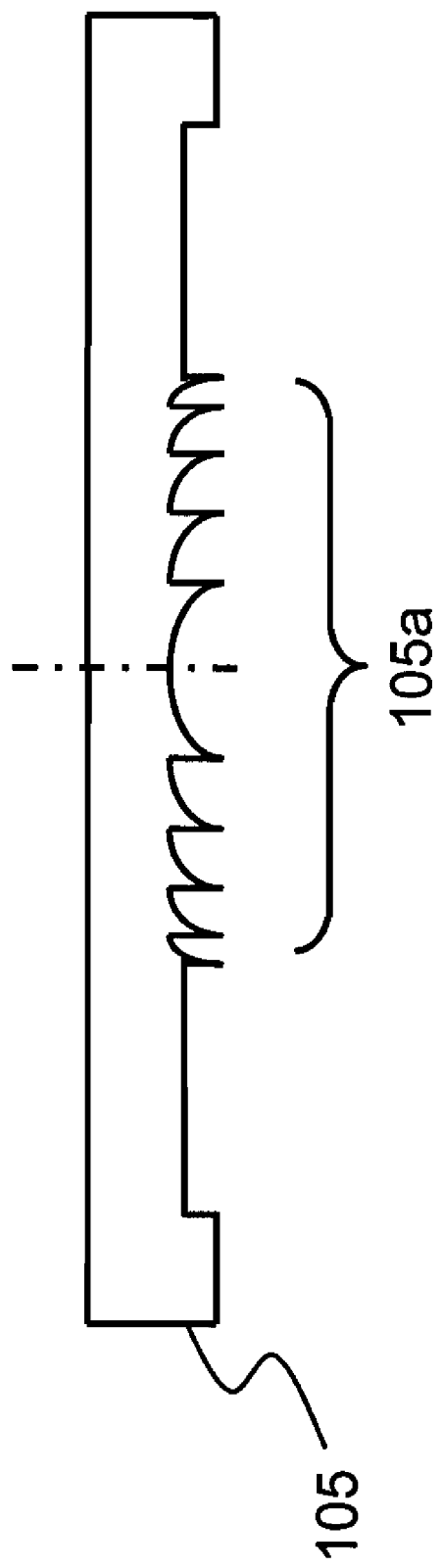
FIG. 20 is a schematic view of diffractive lens in other conventional optical pickup.
Figure 21B:
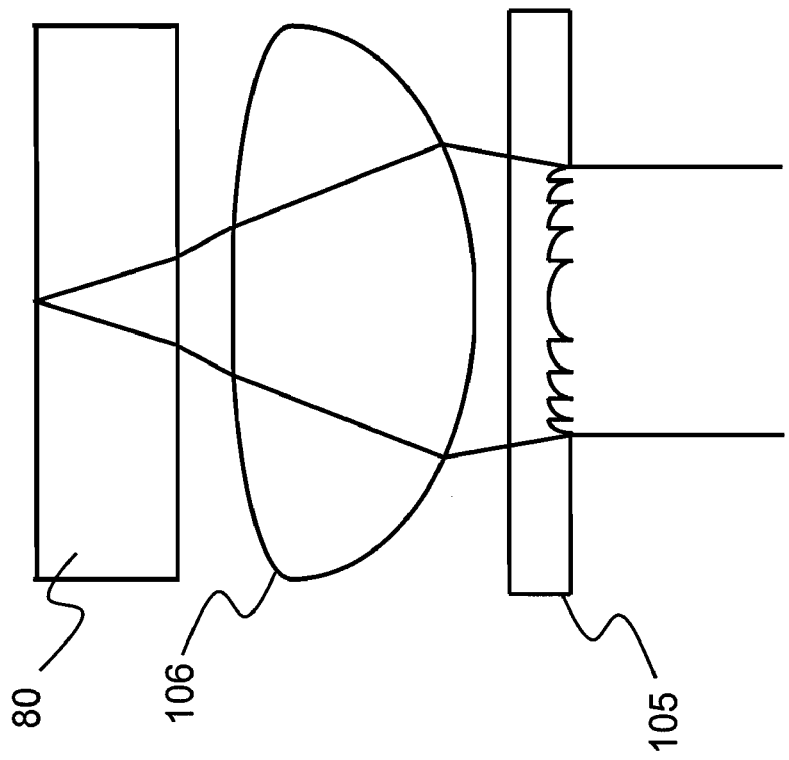
FIG. 21B is a schematic view of operation of diffractive lens and objective lens in a different conventional optical pickup, showing an operation corresponding to CD.
Figure 21A:
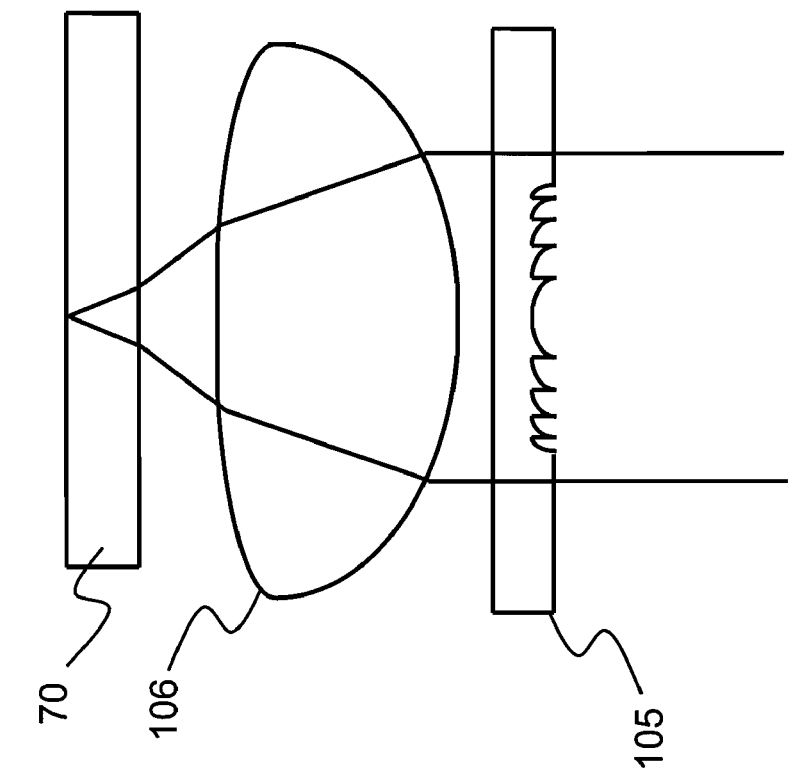
FIG. 21A is a schematic view of operation of diffractive lens and objective lens in a different conventional optical pickup, showing an operation corresponding to DVD.

FIG. 17 is a schematic view of an optical disc recorder according to an eighth embodiment of the invention.

In FIG. 17, an optical disc recorder 430 includes an optical disc device 400 of the fifth embodiment, and a device for converting the information signal to be recorded in an optical disc by the optical disc device 400 into an image signal (for example, encoder 431). Preferably, the optical disc recorder 430 may include a device for converting the information signal obtained from the optical disc device 400 into an image signal (decoder 432), so that the recorded image may be reproduced. It may also include an output device 433 such as cathode-ray tube, liquid crystal display device or printer.

The optical disc recorder 430 includes the optical disc device 400 of the third embodiment, and therefore optical discs of different kinds can be recorded or reproduced, and it is applicable inn a wide range.

The optical pickup of the invention may be also applied in the following embodiments. Specifically, the optical pickup includes a light source, and a focusing lens system for diffracting the laser beam emitted from the light source, and focusing the diffraction light of different degrees of diffraction to an information recording surface of a first high-density recording medium having a first substrate thickness t1, and an information recording surface of a second high-density recording medium having a second substrate thickness t2, in which the relation of substrate thickness is t1<t2, and the quantity of light emitted from the light source when reproducing the first high-density recording medium is smaller than the quantity of light emitted from the light source when reproducing the second high-density recording medium.

An optical pickup in other embodiment includes a light source, and a focusing lens system for diffracting the laser beam emitted from the light source, and focusing the diffraction light of different degrees of diffraction to an information recording surface of a first high-density recording medium, and an information recording surface of a second high-density recording medium, in which the degree of diffraction of focusing on the first recording medium is "a" and the degree of diffraction of focusing on the second recording medium is "b" and the relation of degree of diffraction is a<b, and the quantity of light emitted from the light source when reproducing the first high-density recording medium is smaller than the quantity of light emitted from the light source when reproducing the second high-density recording medium.

The optical pickup of the invention can record or reproduce favorably two different high-density optical discs, such as first high-density optical disc and second high-density optical disc. The structure of the optical pickup is simplified, and the productivity is enhanced, and the optical disc device is presented at low cost.

The computer, optical disc player, and optical disc recorder having the optical disc device of the invention can record or reproduce favorably different high-density optical discs, and are applicable in a wide range.

Although the present invention has been fully described in connection with the embodiments thereof with reference to the accompanying drawings, it is to be noted that various changes and modifications are apparent to those skilled in the art. Such changes and modifications are to be understood as included within the scope of the present invention as define by the appended claims unless they depart therefrom.

What is claimed is:

1. An optical pickup for reproducing information from a first high-density recording medium having a first substrate thickness, a second high-density recording medium having a second substrate thickness, and a low-density recording medium, the optical pickup comprising:
   a light source;
   an optical path changeover unit for changing a laser beam emitted from the light source between a first optical path for the first high-density recording medium and a second optical path for the second high-density recording medium and the low-density recording medium;
   a first focusing lens system for focusing the laser beam of the first optical path onto an information recording surface of the first high-density recording medium, the first focusing lens system including a first objective lens;
   a second focusing lens system having a diffraction grating for focusing the laser beam of the second optical path onto an information recording surface of the second high-density recording medium or the low-density recording medium, the second focusing lens system including a second objective lens having a smaller total transmission efficiency for the laser beam emitted from the light source than a total transmission efficiency of the first objective lens, the first focusing lens system and the second focusing lens system being configured such that quantities of lights of laser beams entering the first objective lens and the second objective lens are nearly equal when a same quantity of light of a laser beam is emitted from the light source; and a light quantity adjusting unit for controlling the light source so that a quantity of light of the laser beam emitted from the light source when reproducing the information from the first high-density recording medium is smaller than a quantity of light of the laser beam emitted from the light source when reproducing the information from the second high-density recording medium.

2. The optical pickup of claim 1, further comprising a collimator lens of a forward path for converting the laser beam of diverging light emitted from the light source into a substantially parallel laser beam,
wherein the optical path changeover unit is disposed between the collimator lens of forward path, and the first focusing lens system and the second focusing lens system.

3. The optical pickup of claim 1, further comprising a first collimator lens disposed in first optical path for converting the laser beam of diverging light emitted from the light source into the substantially parallel laser beam, and
a second collimator lens disposed in the second optical path for converting the laser beam of diverging light emitted from the light source into the substantially parallel laser beam,
wherein the optical path changeover unit is disposed between the light source and the first collimator lens and the second collimator lens.

4. The optical pickup of claim 1, wherein the first substrate thickness of the first high-density recording medium is smaller than the second substrate thickness of the second high-density recording medium.

5. The optical pickup of claim 1, wherein the second focusing lens system includes a diffractive lens and a refractive lens.

6. The optical pickup of claim 1, wherein the second focusing lens system is a diffraction grating integrated objective lens.

7. The optical pickup of claim 1,
wherein the light source is a semiconductor laser for emitting the laser beam at a wavelength of 390 nm to 420 nm,
wherein the first high-density recording medium is about 0.1 mm in substrate thickness, and focuses a luminous flux on the information recording surface at a numerical aperture of 0.8 or more, and
wherein the second high-density recording medium is about 0.6 mm in substrate thickness, and focuses a luminous flux on the information recording surface at a numerical aperture of 0.6 or more.

8. The optical pickup of claim 7,
wherein the first high-density recording medium is used for both recording and reproducing,
wherein the second high-density recording medium is used for reproducing only, and
wherein a quantity of light of a laser beam emitted from the light source when reproducing information from the second high-density recording medium is smaller than a quantity of light of a laser beam emitted from the light source when recording information onto the first high-density recording medium.

9. An optical disc device comprising the optical pickup of claim 1, a motor for rotating and driving a recording medium, and a control unit for controlling the optical pickup and the motor.

10. An optical pickup comprising:
a first light source for emitting a first laser beam for a first high-density recording medium having a first substrate thickness and a second high-density recording medium having a second substrate thickness;
a second light source for emitting a second laser beam for a low-density recording medium of a lower density than the first high-density recording medium and the second high-density recording medium;
a dichroic mirror having a different transmission and reflection characteristic for the a first laser beam and the second laser beam, and for emitting the first laser beam and the second laser beam incident from different optical paths via a same optical path;
a polarization converting element for converting a polarization of the first laser beam emitted through the dichroic mirror;
a beam splitter for polarizing and separating the first laser beam from the first laser beam and the second laser beam emitted through the dichroic mirror on the same optical path, so as to reflect the separated first laser beam along a first optical path, and the first laser beam being separated according to the converted polarization of the first laser beam generated by the polarization converting element;
a first focusing lens system for focusing the first laser beam having the first optical path and reflected by the beam splitter onto an information recording surface of first high-density recording medium, the first focusing lens system including a first objective lens;
a second focusing lens system having a diffraction grating for focusing a laser beam, having a second optical path, configured by the first laser beam and the second laser beam passing through the beam splitter, the laser beam being focused onto an the information recording surface of the second high-density recording medium or the low-density recording medium, the second focusing lens system including a second objective lens having a smaller total transmission efficiency for the laser beam emitted from the light source than a total transmission efficiency of the first objective lens, the first focusing lens system and the second focusing lens system being configured such that quantities of lights of laser beams entering the first objective lens and the second objective lens are nearly equal when a same quantity of light of a laser beam is emitted from the light source; and
a light quantity adjusting unit for controlling the first light source so that a quantity of light of the first laser beam emitted from the first light source is smaller when focused by the first focusing lens system than when focused by the second focusing lens system.

* * * * *